US010119195B2

(12) United States Patent
Mohanty et al.

(10) Patent No.: US 10,119,195 B2
(45) Date of Patent: Nov. 6, 2018

(54) MULTICHANNEL COLD SPRAY APPARATUS

(71) Applicant: THE REGENTS OF THE UNIVERSITY OF MICHIGAN, Ann Arbor, MI (US)

(72) Inventors: Pravansu S. Mohanty, Canton, MI (US); Vikram Varadaraajan, Novi, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 15/295,050

(22) Filed: Oct. 17, 2016

(65) Prior Publication Data

US 2017/0167031 A1 Jun. 15, 2017

Related U.S. Application Data

(63) Continuation-in-part of application No. 12/959,523, filed on Dec. 3, 2010, now Pat. No. 9,481,933.

(Continued)

(51) Int. Cl.
*C23C 24/04* (2006.01)
*C23C 24/08* (2006.01)
(Continued)

(52) U.S. Cl.
CPC ............ *C23C 24/04* (2013.01); *B05B 7/0075* (2013.01); *B05B 7/1404* (2013.01);
(Continued)

(58) Field of Classification Search
CPC ......... C23C 24/04; B05D 3/06; B05B 7/0075; B05B 7/228; B23K 26/144; B23K 26/1476
See application file for complete search history.

(56) References Cited

U.S. PATENT DOCUMENTS 3,872,279 A 3/1975 Fairbairn
3,947,653 A 3/1976 Fairbairn
(Continued)

FOREIGN PATENT DOCUMENTS

CN 101016610 A 8/2007
CN 101111630 A 1/2008
(Continued)

OTHER PUBLICATIONS

Ciarrocca, M., Marangos, J.P., Burgess, D.D., Hutchinson, M.H.R., Smith, R.A., Rae, S.C., Burnett, K., "Spectral and spatial modifications to an intense 1 μm laser pulse interacting with a dense argon gas," Optics Communications 110 (3), (Aug. 1994), pp. 425-434.

(Continued)

*Primary Examiner* — Karl Kurple
(74) *Attorney, Agent, or Firm* — Harness, Dickey & Pierce, P.L.C.

(57) ABSTRACT

A cold spray apparatus for applying a coating of particles to a substrate includes a nozzle assembly having a plurality of inner passages terminating at a common exit. The nozzle assembly includes a particle supply members in communication with the inner passages. The particle supply members supply the particles to flow and accelerate through the inner passages and out of the nozzle assembly via the common exit toward the substrate to be coated thereon. Furthermore, each inner passage includes a laser that emits a laser beam that is transmitted through the inner passage. The laser heats at least one of the particles and the substrate to promote coating of the substrate with the particles.

18 Claims, 18 Drawing Sheets

Related U.S. Application Data

(60) Provisional application No. 61/266,639, filed on Dec. 4, 2009.

(51) Int. Cl.

| | | |
|---|---|---|
| *B05B 7/22* | (2006.01) | |
| *B05B 7/14* | (2006.01) | |
| *B05D 3/06* | (2006.01) | |
| *B05B 7/00* | (2006.01) | |
| *B05B 7/16* | (2006.01) | |
| *B05D 1/12* | (2006.01) | |
| *B23K 26/14* | (2014.01) | |
| *B23K 26/144* | (2014.01) | |
| *B05C 19/00* | (2006.01) | |

(52) U.S. Cl.
CPC .............. *B05B 7/1481* (2013.01); *B05B 7/16* (2013.01); *B05B 7/228* (2013.01); *B05D 1/12* (2013.01); *B05D 3/06* (2013.01); *B23K 26/144* (2015.10); *B23K 26/1476* (2013.01); *C23C 24/08* (2013.01); *C23C 24/082* (2013.01); *C23C 24/085* (2013.01); *B05C 19/008* (2013.01)

(56) References Cited

U.S. PATENT DOCUMENTS

| | | |
|---|---|---|
| 3,947,654 A | 3/1976 | Fairbairn |
| 4,050,408 A | 9/1977 | Beucherie et al. |
| 4,200,669 A | 4/1980 | Schaefer et al. |
| 4,299,860 A | 11/1981 | Schaefer et al. |
| 4,323,756 A | 4/1982 | Brown et al. |
| 4,724,299 A | 2/1988 | Hammeke |
| 4,927,992 A | 5/1990 | Whitlow et al. |
| 4,947,463 A | 8/1990 | Matsuda et al. |
| 4,958,058 A | 9/1990 | Scheidt et al. |
| 4,991,541 A | 2/1991 | Sugata et al. |
| 5,043,548 A | 8/1991 | Whitney et al. |
| 5,271,965 A | 12/1993 | Browning |
| 5,302,414 A | 4/1994 | Alkhimov et al. |
| 5,356,674 A | 10/1994 | Henne et al. |
| 5,449,536 A | 9/1995 | Funkhouser et al. |
| 5,477,026 A | 12/1995 | Buongiorno |
| 5,704,825 A | 1/1998 | LeCompte |
| 5,795,626 A | 8/1998 | Gabel et al. |
| 5,814,152 A | 9/1998 | Thaler |
| 5,961,862 A | 10/1999 | Lewis et al. |
| 6,046,426 A | 4/2000 | Jeantette et al. |
| 6,074,135 A | 6/2000 | Tapphorn et al. |
| 6,122,564 A | 9/2000 | Koch et al. |
| 6,203,861 B1 | 3/2001 | Kar et al. |
| 6,396,025 B1 | 5/2002 | Pyritz et al. |
| 6,534,745 B1 | 3/2003 | Lowney |
| 6,808,755 B2 | 10/2004 | Miyamoto et al. |
| 6,894,247 B2 | 5/2005 | Renteria et al. |
| 6,913,207 B2 | 7/2005 | Miyamoto et al. |
| 6,994,894 B2 | 2/2006 | Hofmeister |
| 7,043,330 B2 | 5/2006 | Toyserkani et al. |
| 7,045,738 B1 | 5/2006 | Kovacevic et al. |
| 7,108,894 B2 | 9/2006 | Renn |
| 7,139,633 B2 | 11/2006 | Mazumder et al. |
| 7,143,967 B2 | 12/2006 | Heinrich et al. |
| 7,259,353 B2 | 8/2007 | Guo |
| 7,582,846 B2 | 9/2009 | Molz et al. |
| 7,605,346 B2 | 10/2009 | Harris et al. |
| 7,705,264 B2 | 4/2010 | Hoebel et al. |
| 7,765,022 B2 | 7/2010 | Mazumder et al. |
| 7,951,412 B2 | 5/2011 | Justin et al. |
| 8,020,509 B2 | 9/2011 | Calla et al. |
| 8,021,715 B2 | 9/2011 | Jensen et al. |
| 8,117,985 B2 | 2/2012 | Whitfield |
| 8,561,668 B2 | 10/2013 | Castle et al. |
| 2001/0042508 A1 | 11/2001 | Kay et al. |
| 2003/0185995 A1 | 10/2003 | Miyamoto et al. |
| 2004/0166247 A1 | 8/2004 | Heinrich et al. |
| 2005/0077380 A1 | 4/2005 | Miyamoto et al. |
| 2005/0252450 A1 | 11/2005 | Kowalsky et al. |
| 2006/0081570 A1 | 4/2006 | Schildgen |
| 2006/0133947 A1 | 6/2006 | DeBiccari et al. |
| 2006/0134347 A1 | 6/2006 | Chiruvolu et al. |
| 2007/0138147 A1 | 6/2007 | Molz et al. |
| 2007/0183919 A1 | 8/2007 | Ayer et al. |
| 2007/0194085 A1 | 8/2007 | Spinella et al. |
| 2009/0288601 A1 | 11/2009 | Bi et al. |
| 2009/0324401 A1 | 12/2009 | Calla |
| 2010/0173087 A1 | 7/2010 | Calla et al. |
| 2011/0300306 A1 | 12/2011 | Mohanty |
| 2012/0199564 A1 | 8/2012 | Washko, Jr. et al. |
| 2012/0240852 A1 | 9/2012 | Ewers |
| 2013/0004673 A1 | 1/2013 | Ikeda |
| 2013/0026247 A1 | 1/2013 | Calla et al. |
| 2017/0173611 A1* | 6/2017 | Tan ................. B05B 7/1481 |

FOREIGN PATENT DOCUMENTS

| | | |
|---|---|---|
| CN | 101208447 A | 6/2008 |
| GB | 2439934 A | 1/2008 |
| JP | 2002016058 A | 1/2002 |
| JP | 2008080323 A | 4/2008 |
| JP | 2008540115 A | 11/2008 |
| JP | 2008302317 A | 12/2008 |
| WO | 9116146 A1 | 10/1991 |
| WO | 2014185993 A1 | 11/2014 |

OTHER PUBLICATIONS

Karthikeyan, J., "Cold Spray Process," ASM Handbook vol. 5A, Thermal Spray Technology, R.C. Tucker, Jr., Editor, 2013, pp. 54-59.

Panarella, E., "Theory of Laser-Induced Gas Ionization," Foundations of Physics, vol. 4, No. 2, 1974, pp. 227-259.

Rae, S.C., "Ionization-induced defocusing of intense laser pulses in high-pressure gases," Optics Communications vol. 97, Isss. 1-2, (Mar. 1993), pp. 25-28.

Brückner, S., Viöl, W., and Wieneke, S., "Interaction of Short Laser Pulses with Gases and Ionized Gases," Coherence and Ultrashort Pulse Laser Emission, Dr. F. J. Duarte (Ed.), (Nov. 2010), pp. 383-402, ISBN: 978-953-307-242-5, InTech, DOI: 10.5772/13102. Available from: http://www.intechopen.com/books/coherence-and-ultrashort-pulse-laser-emission/interaction-of-short-laser-pulses-with-gases-and-ionized-gases.

First Office Action, Japanese Application No. 2012-542224, dated May 20, 2014, Translation by Asamura Patent Office, p.c., dated Jun. 25, 2014, 7 pages.

International Search Report dated Sep. 30, 2011, International Application No. PCT/US2010/058953, Interntional Filing Date: Dec. 3, 2010.

Written Opinion dated Sep. 30, 2011, International Application No. PCT/US2010/058953, Interntional Filing Date: Dec. 3, 2010.

Kuroda, S., Kaihara, S., Fuji, S., Kinoshita, T., Adachi, M., "Modeling of particle generation in laser ablation plasma," Journal of Aerosol Science 50 (2012), pp. 38-56.

First Office Action, Chinese Application No. 201080061809.5, dated Aug. 5, 2014, Translation by Unitalen Attorneys at Law, 21 pages.

Supplementary European Search Report in Correspondending International Application No. EP10835212.1, dated Nov. 18, 2014, 6 pages.

Second Chinese Office Action regarding Chinese Application No. 201080061809.5, dated Mar. 20, 2015. Translation provided by Unitalen Attorneys at Law.

International Search Report and Written Opinion of the International Searching Authority dated Jan. 19, 2018 regarding PCT/US2017/056766.

* cited by examiner

MULTICHANNEL COLD SPRAY APPARATUS

CROSS-REFERENCE TO RELATED APPLICATIONS

This application is a Continuation-In-Part of U.S. application Ser. No. 12/959,523, filed on Dec. 3, 2010, which claims the benefit of U.S. Provisional Application No. 61/266,639, filed on Dec. 4, 2009. The entire disclosures of the above applications are incorporated herein by reference.

GOVERNMENT RIGHTS

This invention was made with government support under grant number N00244-07-P-0553 awarded by the United States Navy. The government has certain rights in the invention.

FIELD

The present disclosure relates to a method and an apparatus for applying a coating to a substrate and, more particularly, to a laser assisted cold spray apparatus and method for applying conformal coating to a large area.

BACKGROUND AND SUMMARY

This section provides background information related to the present disclosure which is not necessarily prior art. This section also provides a general summary of the disclosure, and is not a comprehensive disclosure of its full scope or all of its features.

Cold spraying is a type of additive process in which a stream of solid particles is accelerated to high speeds by a carrier gas through a nozzle toward a substrate. The particles have enough kinetic energy such that upon impact with the substrate, they deform plastically and bond metallurgically/mechanically to the substrate to form a coating. Although, metallurgical bonding is preferred, all the particles may not be necessarily bonded in a metallurgical fashion.

The particles are accelerated to a critical velocity such that the coating can be created. This critical velocity can depend on the properties of the particles and to a lesser degree on the material of the substrate (i.e., deformability, shape, size, temperature, etc.).

It is hypothesized that the particles adhere to the substrate when their kinetic energy is converted to a sufficient level of thermal and strain (mechanical) energy leading to a phenomenon known in art as "adiabatic shear instability." It has been observed that the deposition efficiency of a given material is increased as the temperature of the particles is increased up to a certain extent, which is typically achieved by increasing the carrier gas temperature. The carrier gas temperature also influences the gas dynamics through the convergent-divergent nozzle that is typically used in a cold spray process. In other words, all things remaining constant, a higher carrier gas temperature leads to a higher gas velocity in the divergent section of the nozzle, which in turn may lead to higher particle velocity.

Related U.S. application Ser. No. 12/959,523, taught a method for increasing the particle temperature in the divergent section of the nozzle (independent of the carrier gas temperature), by deploying a laser beam coaxially to the nozzle where the taught rectangular nozzle design along with the particle feeding methodology in the divergent section, enabled enhanced distribution and interaction of the particles with the laser beam within the divergent section of the nozzle to increase the temperature of the particles. In other words, the teachings of the referenced related art provided for a mechanism to independently control the particle temperature and the gas dynamics (velocity) for a given nozzle. Further, a portion of the laser beam also is transmitted to the substrate to enhance the deposition quality.

To deposit a coating, the cold spray nozzle is typically traversed on a substrate while maintaining a suitable target distance. This results in a coating along a small track (typically similar to the width of the nozzle exit) on the substrate. To coat a substrate having an area larger than the nozzle exit width, the nozzle is scanned on the substrate multiple times, typically in a raster pattern with the help of a motion system such as a robot. The nozzle exit width is limited by the gas dynamics requirements for a given convergent-divergent nozzle, to achieve the desired particle velocity as well as the distribution. In other words, for a given gas with a given inlet temperature and pressure, the geometry of the convergent section, the divergent section as well as the throat connecting the two sections, determine the gas flow behavior, which in turn influences the particle velocity and the particle distribution. It is not straight forward to just increase the nozzle cross section area to coat a larger substrate. For practical applications, it is recommended to optimize the geometry of the nozzle so that the necessary flow dynamics can be achieved with standard industrial equipment (gas supply, heater, powder feeder etc.) economically.

One particular difficulty associated with cold spray process arises from defects on the underlying substrate surface. When the surface has an imperfection such as a gap or undulation between two coating passes (tracks), the discontinuity/imperfection may continue to develop in the subsequent layers as the coating builds up. Therefore, it is not recommended to build a thicker layer in a single pass, which may become the precursor to the undulations in the final coating. Further, while coating circular/conical objects with varying surface area, extensive process optimization is required to manage the deposit thickness from the origin towards the periphery or from the vertex towards the base, as the coating mass changes significantly.

From the aforementioned, it is apparent that uniform coatings on large substrates with varying surface area by a single cold spray nozzle, is not easily achieved. New methods and devices are needed for efficient coating fabrication.

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

It is desirable that a cold spray apparatus is capable of coating complex large substrates with high accuracy and efficiency, without necessitating complex tool path optimization and in turn eliminating/minimizing defect growth and subsequent finish machining operation.

Provided is a cold spray apparatus for applying a coating of particles to a substrate, comprising a plurality of nozzles, including each nozzle defining an inner passage that terminates at a common exit for the entire assembly. The nozzle assembly also includes a particle supply members in communication with the inner passages. The particle supply members supply the particles to flow and accelerate through the inner passages and out of the nozzle via the common nozzle exit toward the substrate to be coated thereon. Furthermore, each nozzle includes a laser beam that is transmitted through the inner passage and exits via the common nozzle exit toward the substrate. The laser heats at least one of the particles within the inner passage and the substrate to promote coating of the substrate with the particles.

Provided are methods that solve one or more problems of the prior art optionally by providing in at least one aspect a method for enhancing the interaction of the particles with the laser beam within the inner passage of the nozzle, and thereby improving the energy absorption. This includes minimizing backward scattering of the laser beam by injecting particles in the divergent section of the nozzle, distributing the particles uniformly therein and hence increasing the interaction of the particles with the laser beam.

In some aspects, methods for integrating the particle stream from each nozzle into a common particle stream having substantially uniform particle distribution density and directing the combined stream with substantially uniform particle characteristics towards the substrate are provided to increase the deposition efficiency and uniformity. This optionally includes terminating each nozzle's inner passage at an optimal distance from the common exit of the apparatus assembly.

In yet another aspect, methods for coating complex substrates is provided. This optionally includes organizing a plurality of nozzles, having a predetermined common exit geometry that mimics the substrate geometric profile to be coated or built. Yet further, this also optionally includes supplying a desired amount of particles to each nozzle to achieve differential coating mass on the substrate, which in turn develops a desired geometric profile or conformality.

Accordingly, it becomes possible to solve the above aforementioned problems and to coat complex substrates with high accuracy and efficiency.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The drawings are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Exemplary aspects will become more fully understood from the detailed description and the accompanying drawings, wherein.

Corresponding reference numerals indicate corresponding parts throughout the several views of the drawings.

DETAILED DESCRIPTION

Example embodiments will now be described more fully with reference to the accompanying drawings.

Detailed aspects are disclosed herein; however, it is to be understood that the disclosed aspects are merely exemplary in nature and may be embodied in various and alternative forms. The figures are not necessarily to scale. Therefore, specific details disclosed herein are not to be interpreted as limiting, but merely as a representative basis for any aspect of the invention and/or as a representative basis for teaching one skilled in the art to variously employ the present invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Throughout this specification, where publications are referenced the disclosures of these publications in their entireties are hereby incorporated by reference into this application to more fully describe the state of the art to which this invention pertains.

Figure 1:
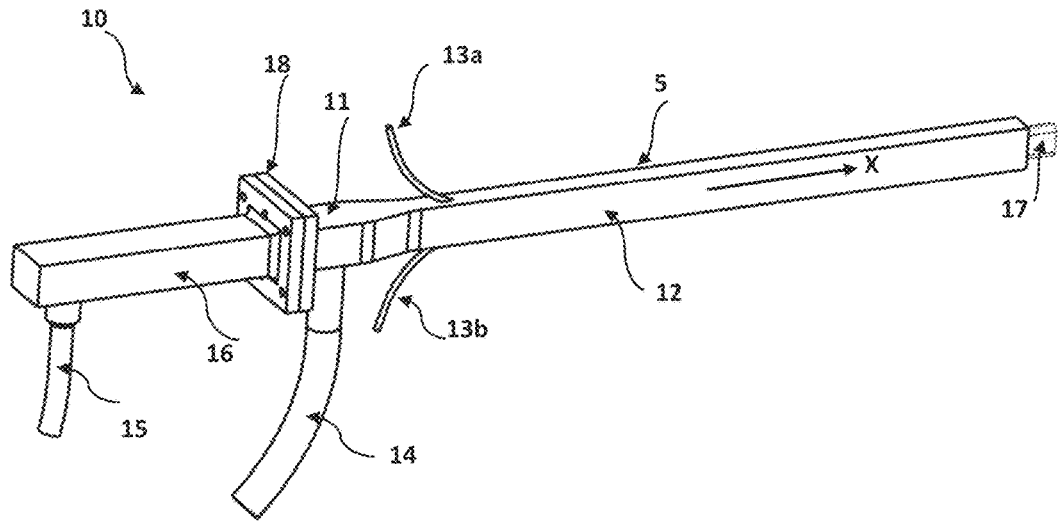
FIG. 1 is a perspective view of rectangular convergent-divergent nozzle with a coaxial laser beam according to some embodiments of the present teachings.

Referring initially to FIG. 1, a cold spray nozzle assembly 10 is illustrated according to various exemplary embodiments of related U.S. application Ser. No. 12/959,523. The cold spray nozzle assembly 10 can be used for applying a coating of particles 17 to a substrate as will be described in greater detail below.

Figure 2:
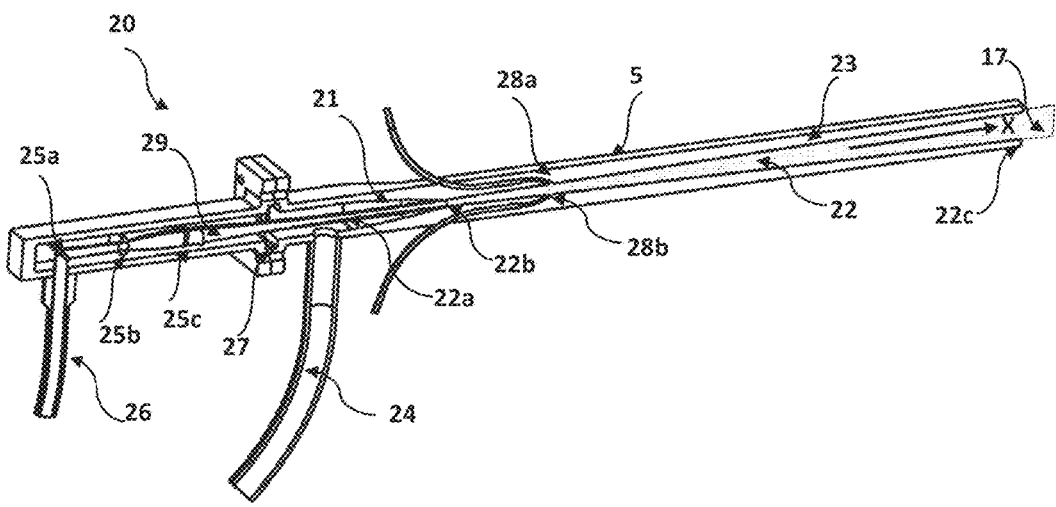
FIG. 2 is a perspective cross section view of rectangular convergent-divergent nozzle with a coaxial laser beam according to some embodiments of the present teachings.

The assembly 10 can include a nozzle 5 having a substantially straight longitudinal axis X. As shown in FIG. 2, the nozzle 5 can define an inner passage 22 that extends parallel to the axis X. The inner passage 22 can also include a nozzle entrance 22a and a nozzle exit 22c at opposite ends thereof (FIG. 2). As shown in FIG. 2, the inner passage 22 can include a convergent section 21 adjacent the nozzle entrance 22a and a divergent section 23 adjacent the nozzle exit 22c. More specifically, both the convergent and divergent sections 21, 23 can be progressively tapered. The convergent section 21 narrows moving away from the entrance 22a, and the divergent section 23 widens moving toward the exit 22c. The convergent section 21 is connected to the divergent section 23 to define a throat 22b (FIG. 2). As will be discussed, the particles 17 flow through the inner passage 22, and the convergent and divergent sections 21, 23 ensure an appropriate flow field in the passage 22 such that the particles 17 move at a sufficient velocity to coat the substrate (not shown).

Figure 5:
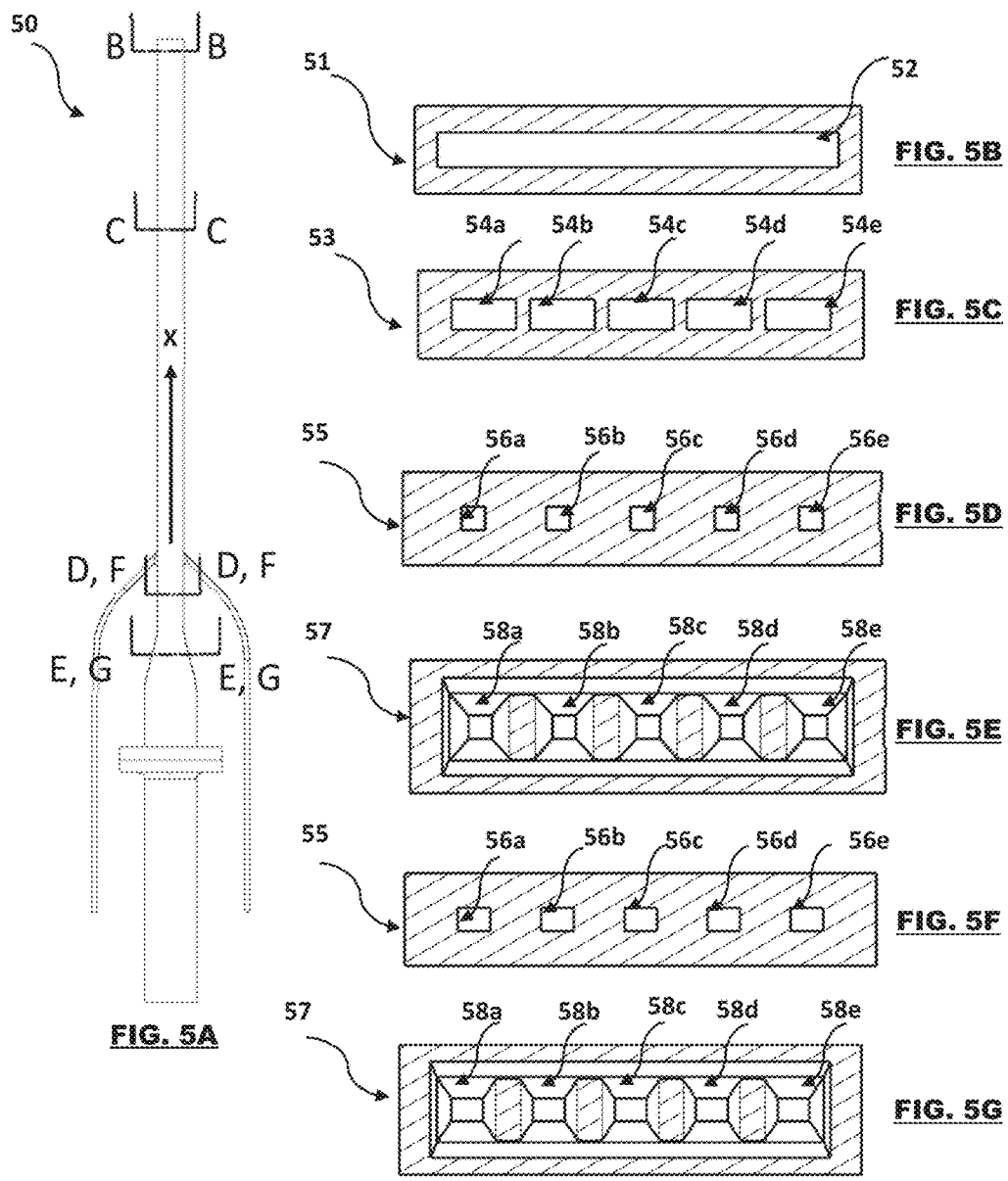
FIG. 5A is the plan view of the convergent-divergent multi-nozzle assembly according to some embodiments of the present teachings.
FIG. 5B is a cross-sectional view of the convergent-divergent multi-nozzle assembly of FIG. 5A taken along line B-B.
FIG. 5C is a cross-sectional view of the convergent-divergent multi-nozzle assembly of FIG. 5A taken along line C-C.
FIG. 5D is a cross-sectional view of the convergent-divergent multi-nozzle assembly of FIG. 5A taken along line D-D illustrating a square cross-section in the throat according to some embodiments.
FIG. 5E is a cross-sectional view of the convergent-divergent multi-nozzle assembly of FIG. 5A taken along line E-E illustrating a square cross-section in the convergent section according to some embodiments.
FIG. 5F is a cross-sectional view of the convergent-divergent multi-nozzle assembly of FIG. 5A taken along line F-F illustrating a rectangular cross-section in the throat according to some embodiments.
FIG. 5G is a cross-sectional view of the convergent-divergent multi-nozzle assembly of FIG. 5A taken along line G-G illustrating a rectangular cross-section in the convergent section according to some embodiments.

As shown in FIG. 1, the nozzle 5 can be substantially rectangular in shape. More specifically, the inner passage 22 (FIGS. 2 and 5B-5E) can have a substantially rectangular cross section taken perpendicular to the axis X. The entire inner passage 22 can have a similar substantially rectangular cross section along the entire axis X of the passage 22; however, it will be apparent that the area of such a cross section will change along the axis X due to the progressive tapering of the convergent and divergent sections 21, 23. It will also be appreciated that the inner passage 22 and the exit 22c can alternatively have any suitable non-circular shape, such as square shape (see FIGS. 5F and 5G).

Furthermore, as shown in FIG. 1, the nozzle 5 can include one or more particle supply inlets 13a, 13b. The nozzle 5 can include any number of inlets 13a, 13b, and the inlets 13a, 13b can optionally be disposed in any suitable location. In the preferred embodiment shown in FIG. 1, there are two inlets 13a, 13b disposed symmetrically on opposite sides of the axis X. The particle supply inlets 28a, 28b (FIG. 2) can each extend transverse to the axis X. For instance, the particle supply inlets 28a, 28b can each be disposed at a positive acute angle relative to the axis X and generally toward the exit 22c. Further, the assembly 10 can include a particle supply member (not shown). The particle supply member can be in (fluid) communication with the inner passage 22 of the nozzle 5 via the inlets 28a, 28b. For instance, the particle supply member can include one or more tubes that are received in and operably coupled to the inlets 28a, 28b, respectively. Thus, as will be discussed, the particles 17 can be supplied from the supply member to flow through the inlets 28a, 28b, through the inner passage 22, and out of the nozzle exit 22c toward the substrate to coat it with the particles 17.

As shown in FIG. 1, the assembly 10 can include a gas supply member 14. The gas supply member 14 can be in fluid communication with a gas source (not shown). The gas source can supply any suitable gas to pressurize the inner passage 22 of the nozzle 5. Moreover, the assembly 10 can include a laser source 16. The laser source 16 can be of any suitable type, such as a diode laser of a known type. The laser source 16 can optionally include a fiber-optic cable 15 and at least one or more (e.g., three shown here) optical elements 25a, 25b, 25c (FIG. 2). The laser source 16 can be operably coupled to the first branch 18 of the pressure tube 11 so as to be substantially coaxial with the axis X. As will be discussed, the laser 16 can emit a laser beam 29 (FIG. 2) that is transmitted through the entrance 22a of the inner passage 22 of the nozzle 5 and out of the nozzle 5 via the exit 22c toward the substrate. The laser beam 29 can be directed substantially parallel to and coaxial to the axis X toward the substrate, although some degree of spread of the beam 29 inward or away from the X axis may optionally be preferred.

Additionally, the assembly 10 can further include a handling device as well as process controller (not shown). The handling device can be of any suitable type, such as a robotic handling device. The controller can be of any suitable type, such as a programmable computer. The controller can be in communication with the laser source, the handling device, the gas supply source, and the particle supply source for operating each. The controller can also optionally be in communication with the pressure tube 11 for receiving feedback regarding the pressure and temperature inside the pressure tube 11.

Now attention is drawn to an optional operational mode of the cold spray nozzle disclosed herein. The controller can move the assembly 10 into a desired position relative to the substrate using the handling device. The controller can cause the gas supply member to supply gas into the inner passage 22 and to the substrate before and during operation of the laser source 16. After the laser 16 has begun operating, the controller can cause the particle supply member to supply the particles 17. The particles 17 can be accelerated by the gas up to or beyond a critical velocity within the inner passage 22 and directed toward the substrate. The energy of the laser beam 29 can heat the particles 17 during flight toward the substrate. In some embodiments, the laser 16 heats the particles 17 below the particles' melting point only in and downstream of the divergent sections. Because the particles 17 are heated, the particles 17 can plastically deform more readily when the particles 17 impact the substrate. Furthermore, the energy of the laser beam 29 can continue to heat the substrate as the particles 17 are ejected toward the substrate. Thus, the substrate can plastically deform more readily. The handling device can continuously move the assembly 10 to evenly coat the substrate with the particles 17 on predetermined areas. It will be appreciated that the operational mode described above is merely an example and shouldn't be interpreted as limiting.

It is noteworthy that the teachings of related U.S. application Ser. No. 12/959,523 include a substantially rectangular nozzle geometry, side particle injection mode, and the coaxial laser coupling, produce unanticipated benefits and advantages compared to the prior art. Because of the substantially rectangular cross section of the inner passage 22 (FIG. 2) and because of the injection of particles at a suitable location along the minor axis plane (28a, 28b) in the divergent section of the inner passage 22, the particles 17 can be distributed more uniformly across the inner passage 22, resulting in more uniform particulate velocities, leading to a fairly even thickness on the substrate (further illustrated in FIG. 9) as compared with prior art systems. The significance of uniform particulate velocity should be appreciated in the context of critical velocity. It is well known that in cold spray applications, the particles must achieve a critical velocity for effective deposition. Particles with velocities below the critical velocity do not metallurgically bond to the target, whereas particle velocity much higher than the critical velocity does not provide any additional benefits, but consumes higher energy. It will be appreciated that the teachings of related U.S. application Ser. No. 12/959,523 provide the best combination of both uniform particle distribution across the nozzle exit, and uniform particle velocities with lower standard deviation. Furthermore, having "a laser that emits a laser beam that is transmitted through the inner passage" thereby provides additional heat energy to the particle within the nozzle, independent of the supply gas as the heat source. Yet further, the taught laser coupling methodology provides for the development of a laser beam profile that mimics the internal passage of the nozzle due to progressive internal reflection. Effective energy transfer occurs due to the uniform particle distribution in the divergent section of the nozzle as well as the beam shape modulation, which provides the maximum chance for interaction of the laser beam with the particles. Accordingly, the finished part can be more aesthetically pleasing, can fit better to other parts, and can have better properties due to in-situ annealing. Moreover, the specific claimed combination results in improved performance unattainable by the prior art.

Although, the teachings of the above referenced related U.S. application Ser. No. 12/959,523 provide for; (i) the development of a uniform particle distribution profile as the particle stream emerges towards the target, (ii) the development of laser beam profile that mimics the internal passage of the rectangular nozzle due to progressive internal reflection, (iii) a uniform exposure of the particles to the laser beam leading to uniform absorption, (iv) no back reflection of the laser beam towards the source that can damage the laser optics, and (v) the uniform treatment of the coated material by the residual laser beam emerging out of the nozzle, which mimics the cross section of the nozzle exit, there remain several unsolved problems that can benefit the cold spray process further. The teachings of this continuation in part disclosure provide for at least some of the unsolved problems as discussed below.

Figure 3:
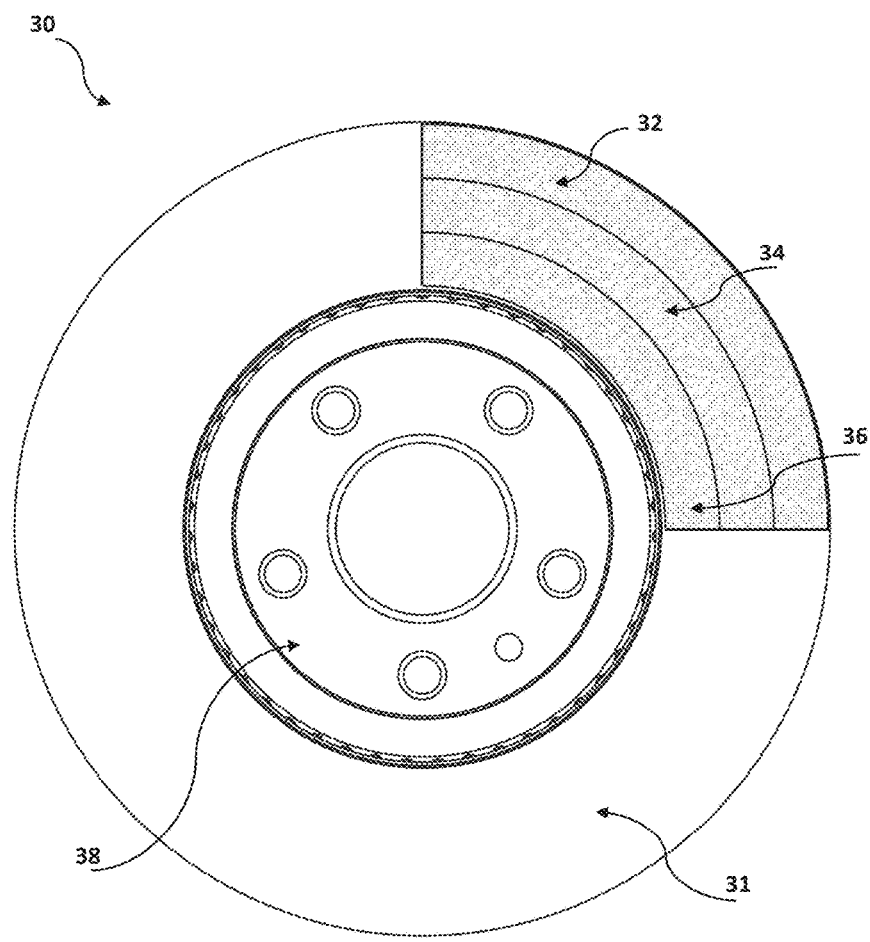
FIG. 3 is a schematic representation of coating mass variation in radial direction of a circular disc according to some embodiments of the present teachings.

Now referring to FIG. 3, a brake rotor 30 is to be coated by a cold spray nozzle assembly 10 described above. It will be appreciated that the coating needs to be applied only to the braking surface 31. The entire braking surface 31 can optionally be coated by moving the cold spray nozzle assembly 10 with the help of a handling device (not shown) such as a robot over the braking surface 31, following a complex and time consuming raster pattern that will ensure a uniform coating thickness, while avoiding coating the unwanted area 38. Alternatively, a combination of rotary motion of the rotor and step wise radial motion of the nozzle assembly, may be simpler and less time consuming. It is to be appreciated that for a given coating thickness, the mass of the coating segment 32, 34 and 36 will vary significantly. Since the nozzle can only coat a small track at a time, the effective residence time of the nozzle at a given track will vary considerably as it moves step wise along the radial direction to keep the coating thickness uniform. Further, the desired coating thickness may not be achieved in a single pass as it will likely leave undulations between successive tracks. In cold spray, the underlying undulations/defects continue to grow as the coating builds up. In summary, extensive process optimization will be necessary to achieve a uniform coating on part 30, which yet may not avoid defective coating as well as the need for considerable amount of finish machining. Particularly the growth of defects is problematic while coating such large surfaces.

Now referring to FIG. 4, a multi nozzle cold spray apparatus 40 is disclosed that can apply a uniform coating of particles 45 across the entire substrate 46 as will be described in greater detail below. It will be appreciated that the width of particle stream 45 can optionally be identical to the width of the substrate 46, however, that may not be sufficient to ensure a uniform coating. Other important particle stream characteristics are necessary to ensure uniform coating and will be described in greater detail below. Further, with the help of a handling device (e.g., robot) the apparatus 40 can be traversed along the length of the substrate 46 to coat the entire surface facing the particle stream 45. Alternatively, the substrate 46 can be traversed while keeping the apparatus 40 stationary to achieve the coating.

Figure 4:
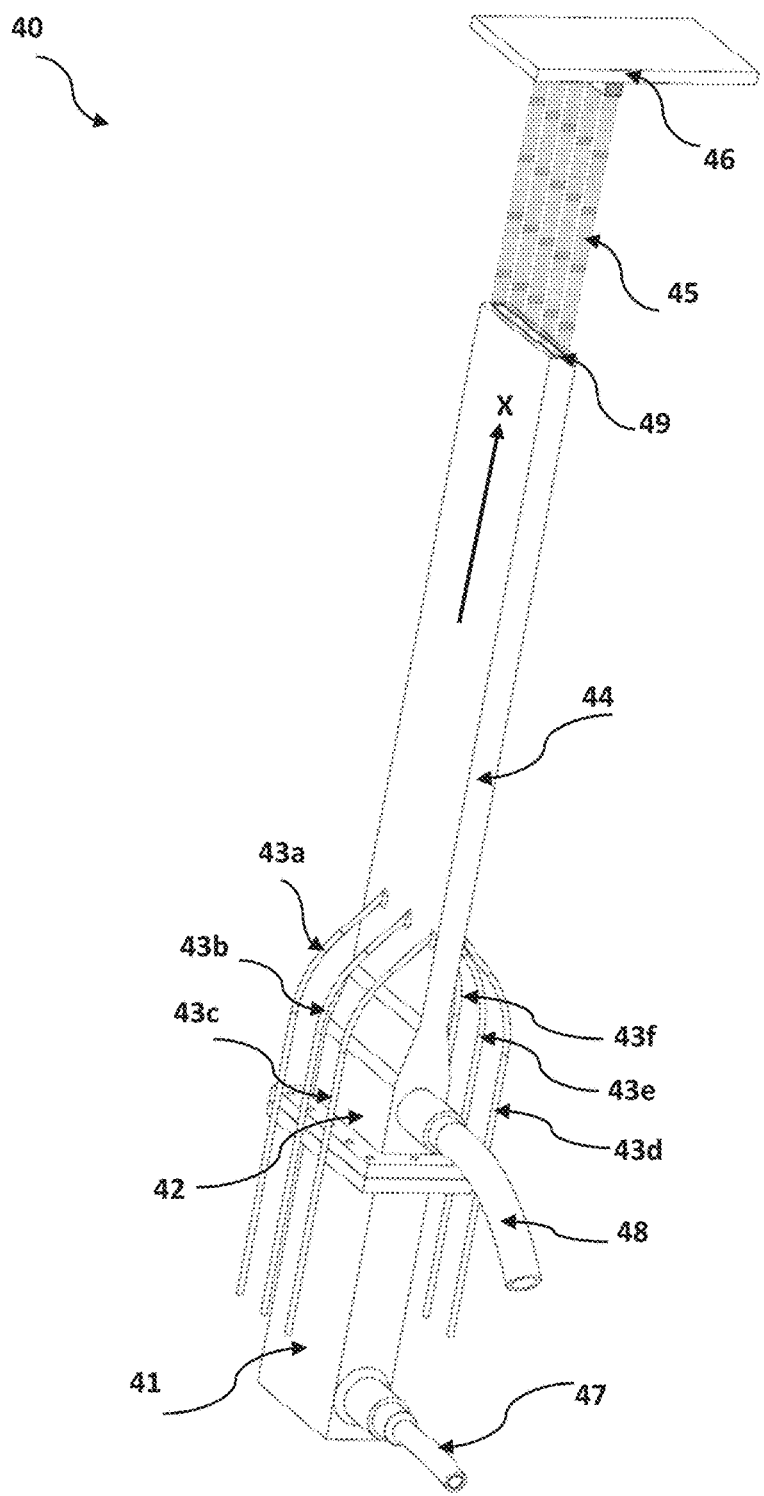
FIG. 4 is a perspective view of rectangular convergent-divergent multi-nozzle assembly with coaxial laser beams according to some embodiments of the present teachings.

The exemplary embodiment of the cold spray apparatus 40 shown in FIG. 4, includes a nozzle assembly 44 having a substantially straight longitudinal axis X and further comprising of a plurality of internal passages. The number of internal passages can be at least two and optionally can be 3 or 4 or 5 or 6 or many, depending on the width of the required coating as well as the geometric characteristics of the internal passages. Additionally, the geometric characteristics of these internal passages mimic the preferred embodiment 22 (FIG. 2), to a large extent. Further, the apparatus 40 can include a gas supply member 48, operably in communication with a pressure chamber 42, a plurality of particle supply members 43a through 43f, operably in communication with internal passages of the nozzle assembly 44. The cross sectional views of apparatus 40 (FIG. 5A) taken transverse to the axis X at different locations are provided in FIGS. 5B-5G. The cross section 57 taken adjacent to the pressure chamber 42 shows five tapered inlets 58a, 58b, 58c, 58d and 58e. Further, cross section 55 includes five passages 56a, 56b, 56c, 56d and 56e, which are substantially smaller than the inlets shown in cross section 57. Additionally, the cross sectional area of the internal passages (54a, 54b, 54c, 54d and 54e) progressively increase in size toward the exit 49 as shown in cross section 53. Furthermore, adjacent to the nozzle exit 49, there is only one substantially large passage 52, resulting from the merger of the all the passages illustrated above.

Figure 6:
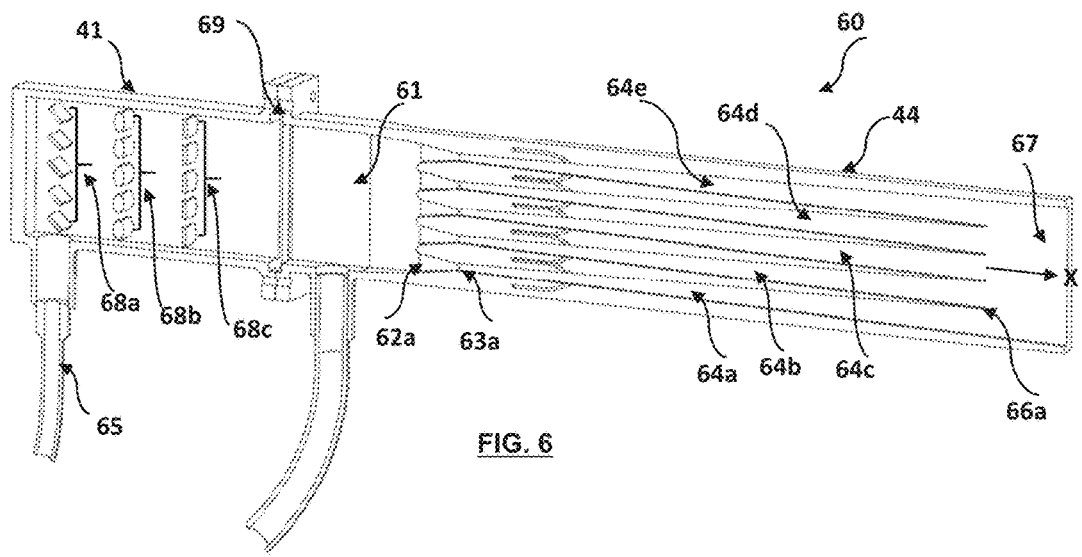
FIG. 6 is a perspective cross section view of the convergent-divergent multi-nozzle assembly according to some embodiments of the present teachings.
Figure 7:
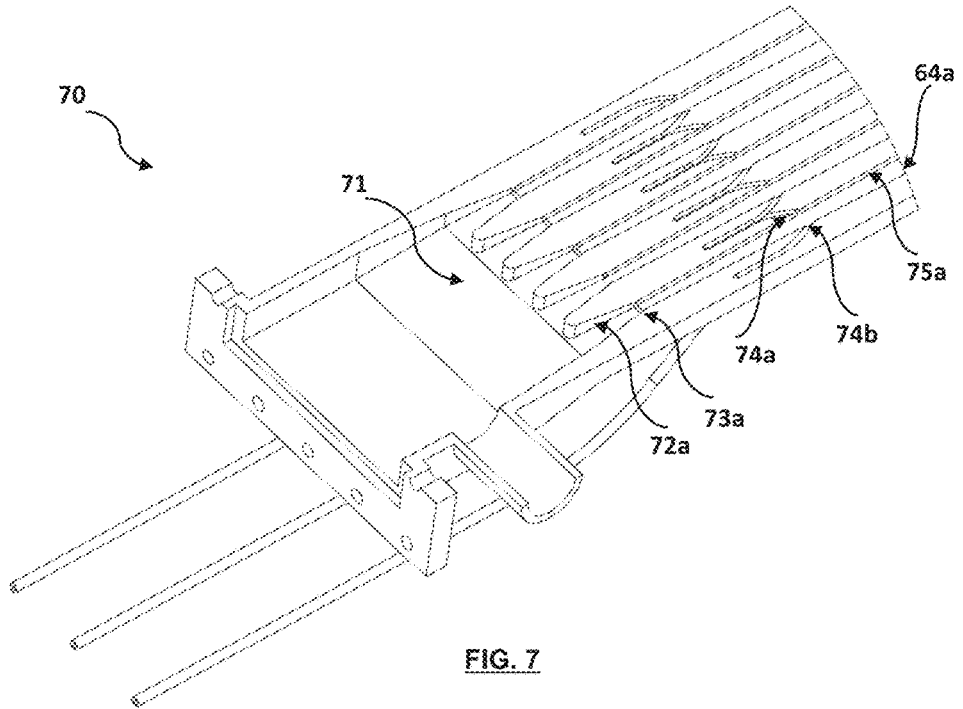
FIG. 7 is a perspective cross section view of the convergent section of the multi-nozzle assembly according to some embodiments of the present teachings.

Further details of nozzle assembly 44 is shown in FIG. 6, which is the cross sectional view 60 taken along the symmetric plane of the multi nozzle apparatus 40. The inner passages 64a, 64b, 64c, 64d and 64e extend substantially parallel to the axis X. These passages optionally can be similar (not necessarily same) to each other, however in a preferred embodiment shown here, they are optionally kept identical. In that spirit, further details of only one passage 64a is discussed below and it is understood that all other passages (64b, 64c, 64d and 64e) possess similar characteristics. The inner passage 64a can include a nozzle entrance 62a and a nozzle exit 66a at opposite ends thereof. As shown in FIG. 7, the inner passage 64a can include a convergent section 72a adjacent the nozzle entrance 62a and a divergent section 75a adjacent the nozzle exit 66a. More specifically, both the convergent and divergent sections 72a, 75a can be progressively tapered. The convergent section 72a narrows moving away from the entrance 62a, and the divergent section 75a widens moving toward the exit 66a. The convergent section 62a is connected to the divergent section 75a to define a throat 73a (FIG. 7). The particles flow through the inner passage 64a, and the convergent and divergent sections 72a, 75a ensure an appropriate flow field in the passage 64a such that the particles move at a sufficient velocity before they enter the common nozzle assembly exit 67. Each inner passage can receive the accelerating carrier gas from a common pressure chamber 61, or optionally the pressure chamber can be separated.

Additionally, each inner passage can include a plurality of particle supply inlets. The inner passage can include any number of inlets, and the inlets can optionally be disposed in any suitable location. In the preferred embodiment shown in FIG. 7, there are two inlets 74a, 74b for internal passage 64a, disposed symmetrically on opposite sides of the passage. The particle supply inlets 74a, 74b (FIG. 7) can each extend transverse to the axis X. For instance, the particle supply inlets 74a, 74b can each be disposed at a positive acute angle relative to the axis X and generally toward the exit 66a (FIG. 6). Further, the assembly 40 can include a particle supply source (not shown). The particle supply source can be in (fluid) communication with the inner passages of the nozzle via the particle supply members 43a through 43f. For instance, the particle supply member can include one or more tubes that are received in and operably coupled to the inlets. Thus, as will be discussed, the particles 45 can be supplied from the supply source to flow through the inlets 74a, 74b, through the inner passage 64a, and out of the nozzle exit 66a toward the substrate to coat it with the particles 45.

Furthermore, the apparatus assembly 40 can include a laser source 41. The laser source 41 can be of any suitable type, such as a diode laser of a known type. Each inner passage of the nozzle assembly 44 can optionally include a laser beam. The laser source 41 can optionally include a fiber-optic cable 47. In a preferred embodiment shown in FIG. 6, fiber 65 brings in one laser beam from a source (not shown), which can optionally split into a plurality of laser beams through a semitransparent mirrors assembly 68a. The semitransparent mirror assembly can be any known type that enable a desired fraction of the laser beam to be transmitted through each mirror and reflecting the remaining fraction in substantially parallel direction of axis X. Subsequently, each reflected fraction of the laser beam is processed through at least one or more (e.g., two shown here) optical element (e.g., lens) assemblies 68b, 68c (FIG. 6). The laser source 41 can be operably coupled to the first branch 69 (FIG. 6) of the pressure tube 42 so as to keep all the laser beams substantially coaxial with the axis X. Further details on the laser beam propagation through the will be provided below.

Figure 8:
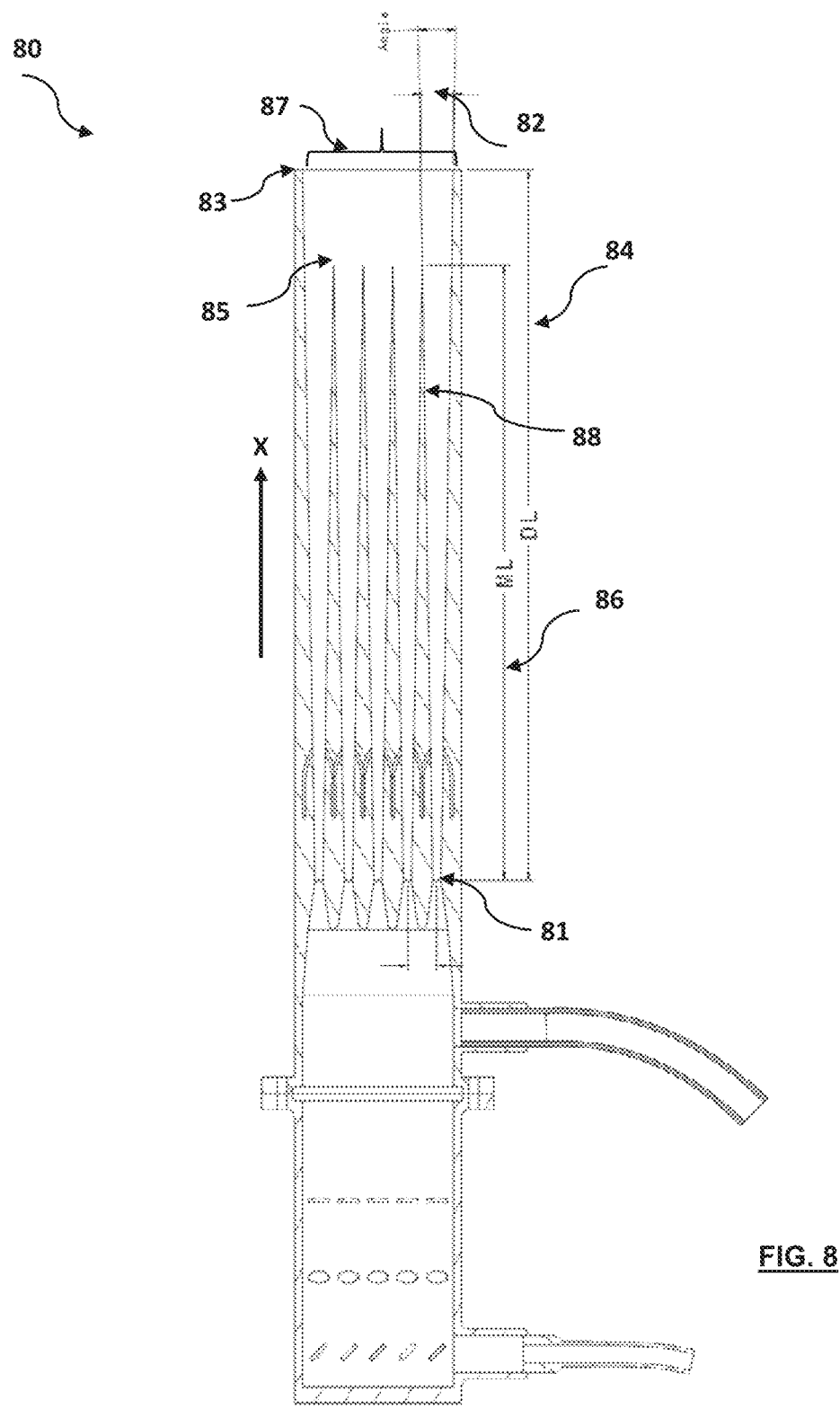
FIG. 8 is a cross sectional view of the convergent-divergent multi-nozzle assembly taken along the major axis of the rectangle according to some embodiments of the present teachings.

Now referring to FIG. 8, each inner passage of the apparatus assembly 80 can optionally terminate at 85 away from the exit 83. For convenience, the distance between the throat of the inner passage 81 (divergence section) to the termination point 85 is defined as ML and the between the throat of the inner passage 81 to the exit 83 is defined as DL. It will be appreciated that the divergence angle of each inner passage will remain constant to maintain a progressive taper of the inner passage in axis X direction, however, the projected exit width 82 of each inner passage will depend on DL. Further, the total maximum opening width 87 of the apparatus assembly 80 will be the sum total of the projected exit width 82 of all channels. Further, a term nozzle overlap is defined as: [(DL−ML)/DL]*100. When ML is equal to DL, i.e., each internal passage terminates at the exit 83, resulting in a 0% over lap. It will be appreciated that the wall between each internal passage will have a finite dimension, and therefore, fabricating a nozzle assembly having 0% overlap is practically difficult. For example, if a plurality of individual nozzle assembly 10 (FIG. 1) were physically joined together, it will lead to a situation where ML is greater than DL resulting in a negative overlap. In a preferred embodiment 80 shown in FIG. 8, the overlap can optionally be between 0.5% and 50%. The influence of the overlap on the particulate characteristics and the resulting coating will be discussed in greater detail below.

To demonstrate the specific benefits of the teaching of the present invention, flow simulations for different overlap percentages are presented below. The simulations were carried out employing flow simulation software Fluent 16.0. The following conditions (typically used in our process) were employed in each simulation case: Gas Pressure—500 psi, Gas temperature—600° C., Powder Feed Rate—30 g per minute per inner passage, Particle size—15 μm, Material—Steel, DL—10.9 inch, and divergence angle (82)—1.905 degree. Further for flow simulation, Reynolds Stress Model with pressure velocity coupled and quick discretization for density and momentum were employed. Additionally, particle injection scheme of DPM with stochastic tracking (Random walk model) was adopted. Furthermore, the teachings of related U.S. application Ser. No. 12/959,523 include a substantially rectangular internal passage, side particle injection along minor axis plane, and the coaxial laser coupling that produce unanticipated benefits and advantages compared to the prior art, were incorporated in the simulation.

Figure 9:
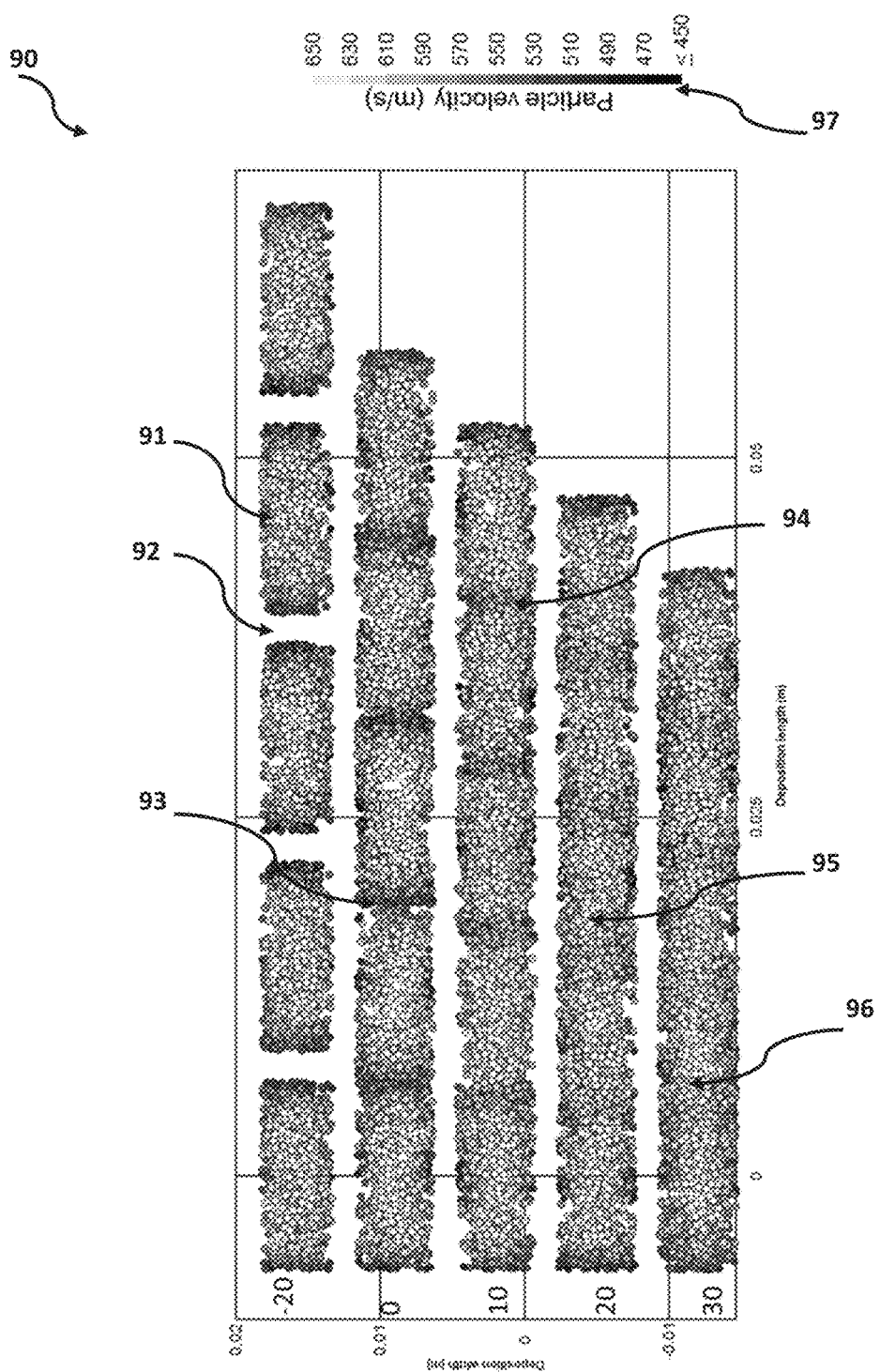
FIG. 9 is simulation results showing particle distribution density and velocity at 10 mm target distance according to some embodiments of the present teachings.

Referring to FIG. 9, the particle impact map 90 on a target substrate situated 10 mm away from the nozzle assembly exit 83 (FIG. 8) for different overlap percentages is presented. Further, the corresponding particle velocity magnitude is also superimposed on this map according to a gray scale 97; the lighter shade indicates higher velocity whereas the darker shade indicates lower velocity. Now referring to the case of −20% overlap which is achieved by simply adjoining a plurality (five here) of nozzles 10, significant gaps 92 in the particle distribution map are observed. These gaps indicate that no coating will be forming on those areas of the target. Further attention is drawn to the zones 91 that have recorded particle impacts indicating a fairly uniform distribution of the particles in those areas. Further, the lighter shade in much of the map also indicates that a significant number of particles achieved uniform higher velocities except for those at the edges of each patch (91). The cold spray developer community has conventionally tried to achieve uniform higher velocity (above the critical velocity required to achieve particle adhesion at the target) for maximum number of particles which leads to maximum deposition efficiency. Further, it is generally believed that axial injection provides the maximum particles velocities. However, one skilled in the art wouldn't normally expect a significant number of particles attaining high particle velocities and a uniform distribution profile with side injection in the divergent section as shown in FIG. 2. It will be appreciated that the teachings of related U.S. application Ser. No. 12/959,523 include a substantially rectangular internal passage geometry along with the side particle injection mode, leads to results that are contrary to conventional wisdom. As will be demonstrated below, an axial injection may not provide such uniform particle velocity as well as uniform distribution across the entire nozzle opening. It will be appreciated that for an overlap of −20%, the uncoated area 92 is expected to be more than that doesn't have particle impact as the velocities of the adjacent particles (darker shade) are quite low and they are not expected to bond with the target.

Figure 10:
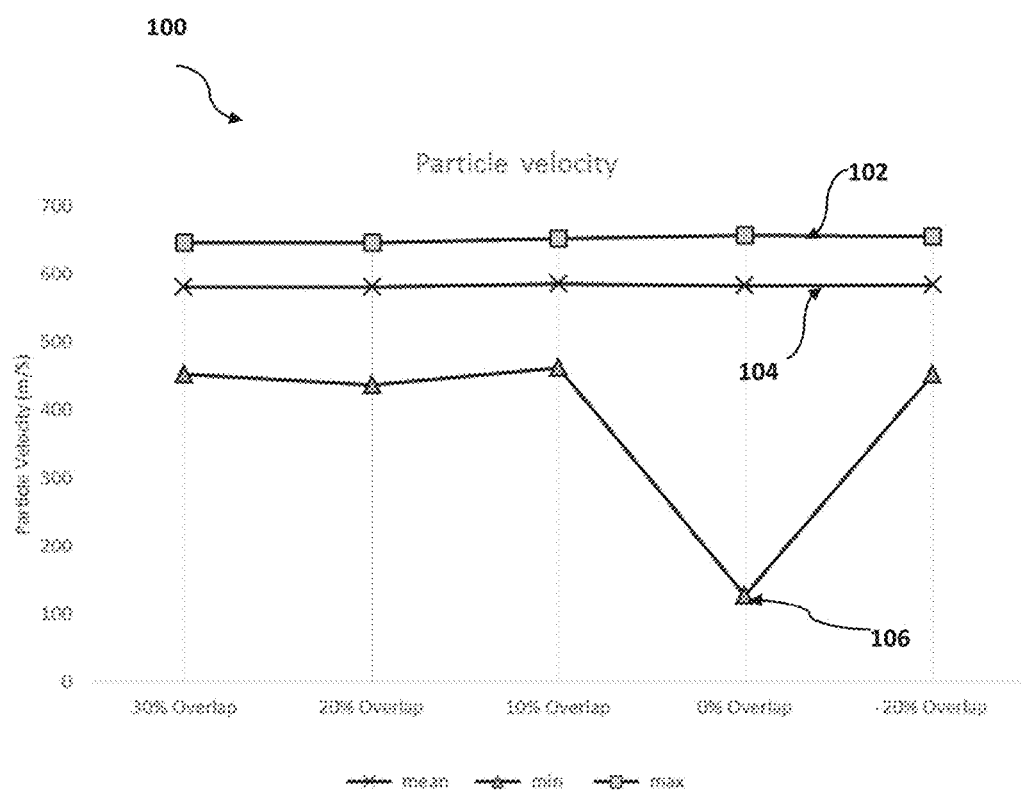
FIG. 10 is simulation results showing maximum, average and minimum particle velocity at 10 mm target distance according to some embodiments of the present teachings.
Figure 11:
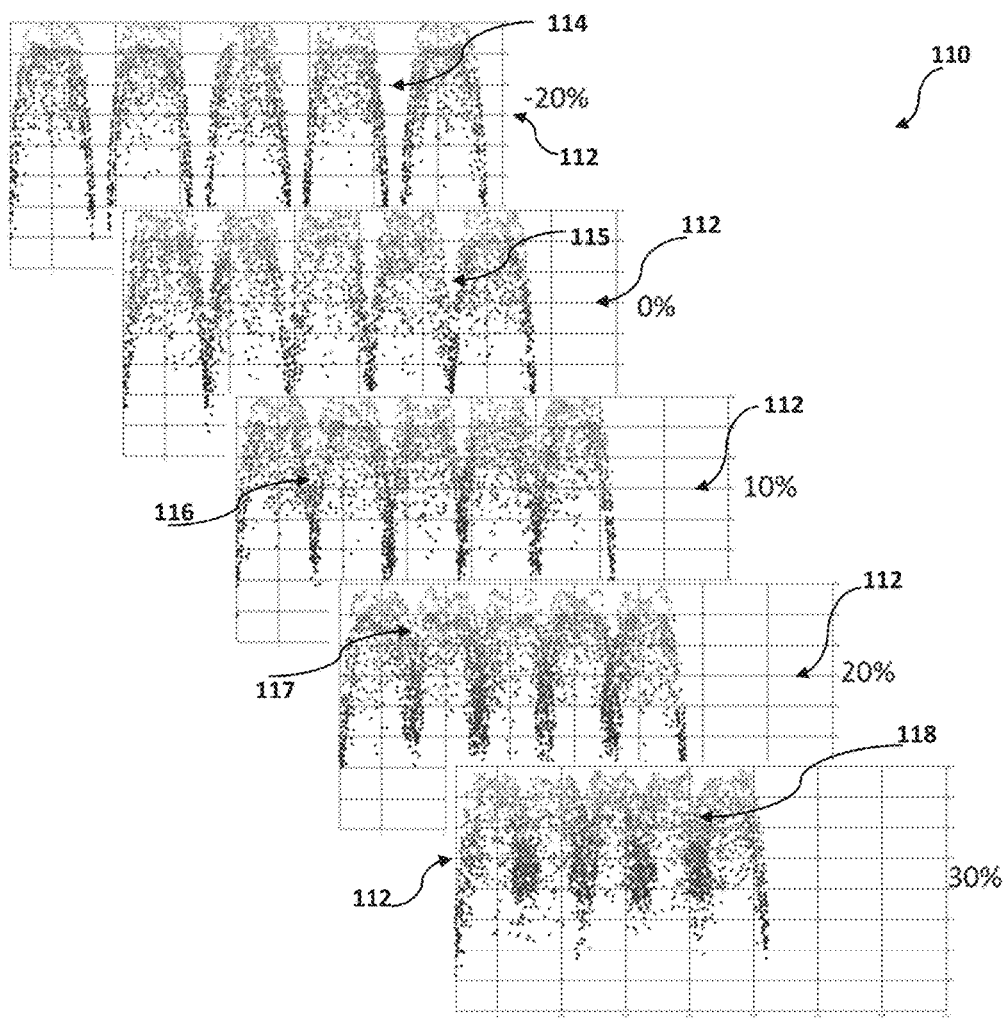
FIG. 11 is simulation results showing particle velocity distribution along major axis of the rectangular nozzle assembly at 10 mm target distance according to some embodiments of the present teachings.

Further, when the overlap is 0%, although the particle map shows uniform coverage, zones 93 with significantly low velocities are present and it is anticipated that coatings will not be formed in those areas. This is further substantiated from FIG. 10 which provides the maximum, the average and the minimum particle velocities for different overlap percentages. As seen from this plot, the lowest particle velocity (106) is achieved for 0% overlap. Furthermore, with 10% overlap there is a significant reduction in the particles with lower velocities (darker shade), while at 20% overlap, almost all particles show uniform higher velocities (lighter shade). Additionally, at 30% overlap, no specific improvement in particle velocity shading is observed, however, the length of the particle impact zone is substantially reduced. The significance of the length of the particle impact zone is that, the longer it is, the more target area can be coated in a single traverse of the apparatus 40 (FIG. 4), provided that the impacting particles have the needed critical velocity and uniformity in distribution. Therefore, overlaps beyond a point may not provide any additional benefits, but on the other hand may lead to thicker and narrower coatings that may not be desired. Further insight to optimal overlap percentage can be gained from the particle velocity distribution map shown in FIG. 11. As will be appreciated, for best coating results, it is desirable that all particles attain a velocity that is higher than the critical velocity of the material being deposited. However, it is practically difficult to get all the particles developing velocities higher than the critical velocity. In other words, in a given cold spray nozzle, there always will be some particles that fail to attain the critical velocity, however, it is always a design goal to provide the maximum number of particle with velocities higher than the critical velocity. Further, it is also desired that these particles are distributed uniformly across the particle stream such that uniform coating can be fabricated. With that background, referring to FIG. 11, it is observed that at −20% overlap there are significant number of particles that attain velocities higher than the critical velocity 112. However, in the region between two particle streams 114, there are no particles and obviously no coating will be formed in that zone. Further, at 0% overlap there are significant number of particles that attain velocities higher than the critical velocity 112, however, the region between two particle streams 115, although sees particles, but with velocities lower that the desired critical velocity 112. As a result, no coating is expected to form in zone 115. In contrast, at 10% overlap, there are many particles in the region between two particle streams 116 that possess velocities higher than the critical velocity 112 and expected to form a coating in that region. As the overlap grows to 20%, the number of particles with velocities higher than the critical velocity 112 has grown considerably in region 117 and an overall good coating across the particle streams is expected. Further, with 30% overlap, although the width of particles stream shrunk, but the number of particles with velocities higher than the critical velocity in region 118 didn't appear to increase any further. Therefore, any added benefit is not expected from 30% overlap, but on the other hand it may be detrimental in terms reducing the coating width. Therefore, the preferred overlap can optionally be between 10 and 30%, but, it can be further lower depending upon the material's critical velocity. For example, an overlap of 10 may have enough number of good particles in region 115 for a material whose critical velocity is substantially lower than 112.

Figure 12:
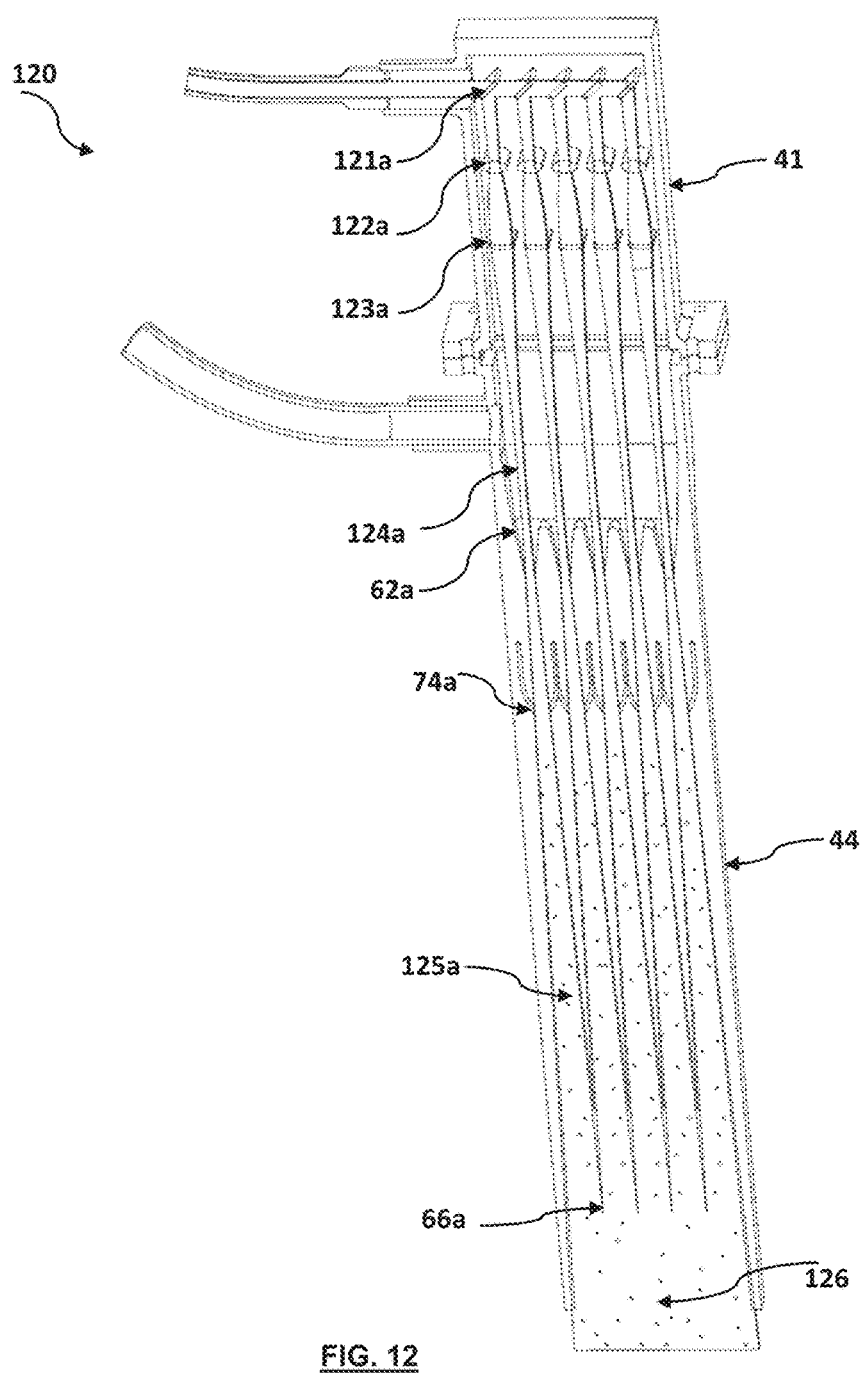
FIG. 12 is a perspective cross section view of the convergent-divergent multi-nozzle assembly showing the schematic laser beam profile achieved according to some embodiments of the present teachings.

Now referring to FIG. 12, the laser source 41 can provide a laser beam 124a that is transmitted through the entrance 62a (FIG. 6) of the inner passage 64a (FIG. 6) of the nozzle 44 and out of the inner passage 64a via the exit 66a toward the substrate. The laser beam 124a can be directed substantially parallel to and coaxial to the axis X toward the substrate, although some degree of spread of the beam 124a inward or away from the X axis may optionally be preferred. Laser absorption is a line of sight process. For a central laser beam 124a to pass through the inner passage, the laser beam has to achieve a minimum dimension at or around the throat 63a (FIG. 6) of the inner passage, which means it achieves a maximum power density (total power/beam cross sectional areas) near the throat. If particles were injected axially through the throat 63a as commonly practiced in industry, the particle stream also has to pass through the throat simultaneously with the laser beam. As a result, the particles will block a major portion of the laser beam at the throat leading to back reflection, beam distortion, and non-uniform absorption. Back reflection can damage the optics 121a, 122a, 123a. The side injection scheme via 74a and 74b (FIG. 7) beyond the throat (i.e. in the divergent section) of the present invention allows the laser beam to interact with the particles beyond its focal point and in the divergent section of the inner passage. Any scattered fraction of the laser beam in the divergent section of the inner passage will not travel back to the optics via the throat 63a. Furthermore, due to the progressive divergence of the inner passage beyond the throat as well as the substantially rectangular cross section, forward scattering and multiple internal reflections will be promoted leading to a laser beam profile 125a that mimics the internal passage. The net results are: (a) uniform exposure of the particles to the laser beam leading to uniform absorption, and (b) no back reflection of the laser beam towards the source that can damage the laser optics. A circular beam cross section with Gaussian intensity distribution transforming into a rectangular profile with top hat distribution is caused by this specific combination of particle injection scheme, nozzle shape, as well as laser coupling with the nozzle. Same benefits can occur to all other laser beams transmitting through all other internal passages in the preferred embodiment 120 shown in FIG. 12. It will be appreciated that the common exit passage 67 (FIG. 6) assumes a substantially rectangular shape as each internal passage. All the modulated laser beam emanating from each inner passage via exit 66a can further scatter and modulate into a single beam 126 mimicking the cross section profile of the common exit passage 67 and thereby causing uniform treatment of the coated material by the residual laser beam emerging out of the nozzle exit 49 (FIG. 4).

Figure 13:
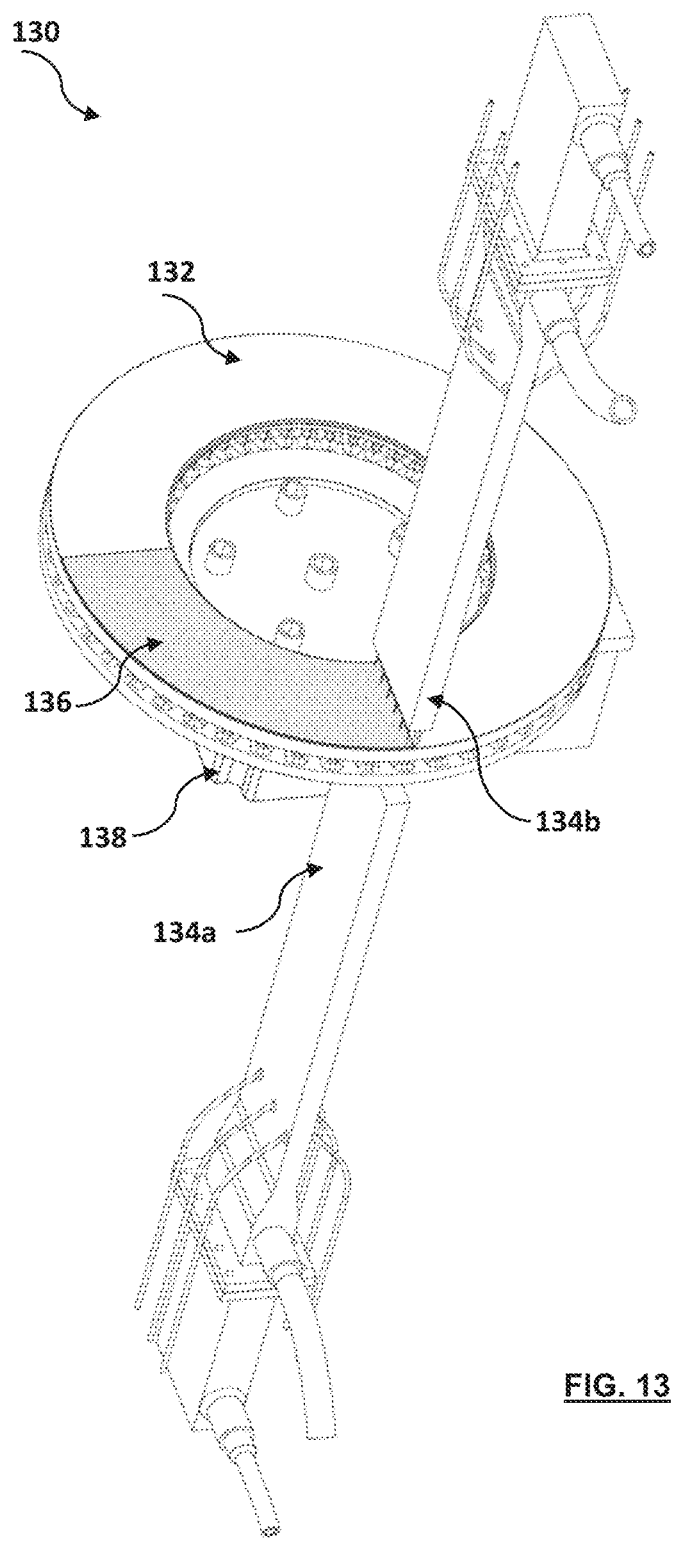
FIG. 13 is a perspective view of the device arrangement for coating both sides of a brake rotor employing the nozzle assembly disclosed herein.

Referring to FIG. 13, embodiment 130 can be utilized to simultaneously coat both braking surfaces of a brake rotor. It includes two multi nozzle cold spray apparatuses 134a and 134b. Apparatus 134b can be kept stationary in place to coat 136 the entire surface 152 simultaneously while rotating the brake rotor with a motor 138. As discussed earlier, the coating mass will vary significantly along the radial direction. Therefore, the injected mass of particles can progressively change from inside channels toward the outmost channels of the apparatus 134b. Further, the beam power passing through each channel can progressively vary to provide equivalent heat energy per unit mass of the coating. This can be achieved by appropriate optical elements used in the laser source 41 (FIG. 12). Accordingly, a uniform coating without raster marks and the related defects can be fabricated rapidly.

Figure 14:
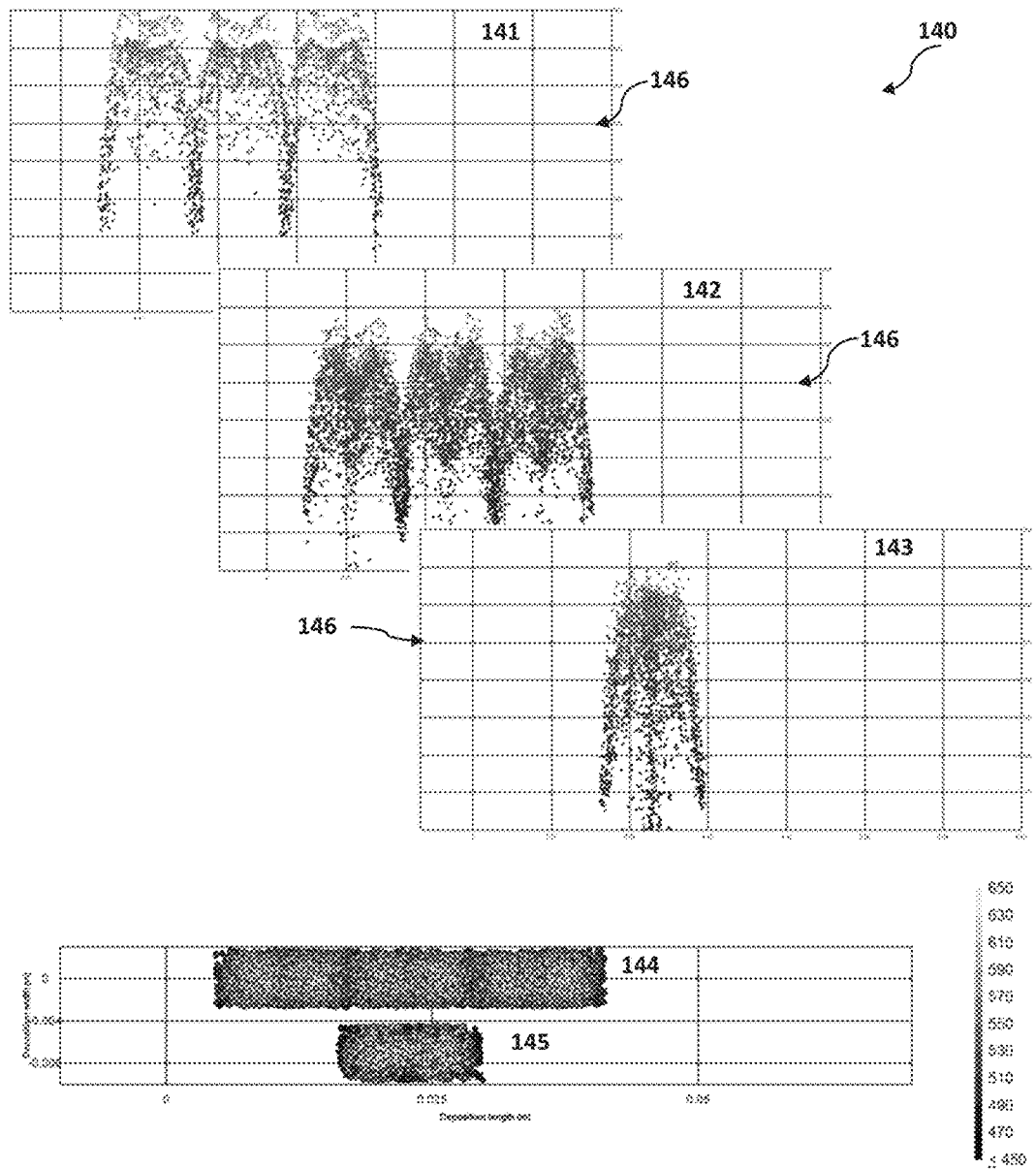
FIG. 14 is simulation results showing particle velocity distribution as well as particle distribution map when one and three channels are operated according to some embodiments of the present teachings.
Figure 15:
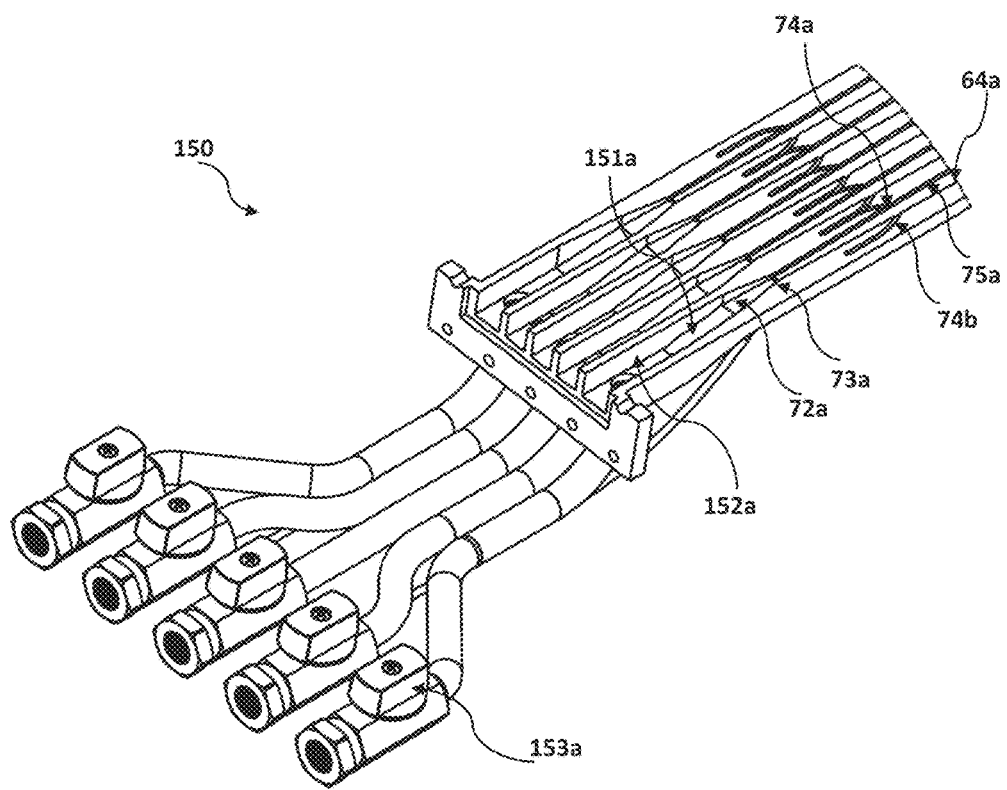
FIG. 15 is a perspective cross section view of the convergent section of the multi-nozzle assembly showing separate pressure tubes feeding carrier gas to each internal passage according to some embodiments of the present teachings.

Although the multi nozzle cold spray apparatus 40 can coat a large area without raster patterns and defects, it can also be used to fabricate coatings similar to that can be obtained by a single nozzle 10. FIG. 14 presents the simulated particle distribution map as well as the corresponding particles velocity distribution maps when the apparatus 40 was operated in different modes. A 10% over lap was considered in these simulations. Particle distribution map 145 was obtained when the particles and the carrier gas were injected only in one internal passage, which is equivalent to operating one single nozzle 10. It will be appreciated that to run the apparatus in a single channel mode, the carrier gas will continue to flow through the channels that are not in use because the internal passages receive the carrier gas from the common pressure chamber 71. Alternatively, the pressure chamber 71 can be separated to feed each internal passage separately. Referring to FIG. 15, the internal passage 64a can optionally receive carrier gas from pressure tube 151a, which is isolated from the neighboring pressure tube by a wall 152a. It will be appreciated that only a partial view of symmetric half portion 150 of the nozzle assembly 40 is shown in FIG. 15. Further, the pressure tube 151a is in fluid communication with a gas supply source via control valve 153a. Accordingly, each internal passage (64a, 64b, 64c, 64d and 64e of FIG. 6) can optionally receive carrier gas from its corresponding pressure tube, which is isolated from its neighboring pressure tube by a wall. Further, each pressure tube is in fluid communication with a gas supply source via its corresponding control valve. Particle distribution map 144 (FIG. 14) was obtained when the particles and the carrier gas were injected only through 3 adjacent internal passages. The corresponding particle velocity distributions are presented in map 143 and 142. As can be seen the influence of the common exit nozzle 67 (FIG. 6) on the particle distribution map (i.e., the width of the coating) is not significant. Further simulations were carried by supplying carrier gas to all five internal passages, but feeding particles only to 3 adjacent internal passages. As seen in map 141, the number of particles possessing velocities above the critical velocity 146 increased significantly. However, the particle distribution map wasn't noticeably different from 144. Accordingly, the material deposition efficiency can be significantly increased in this mode.

Figure 16:
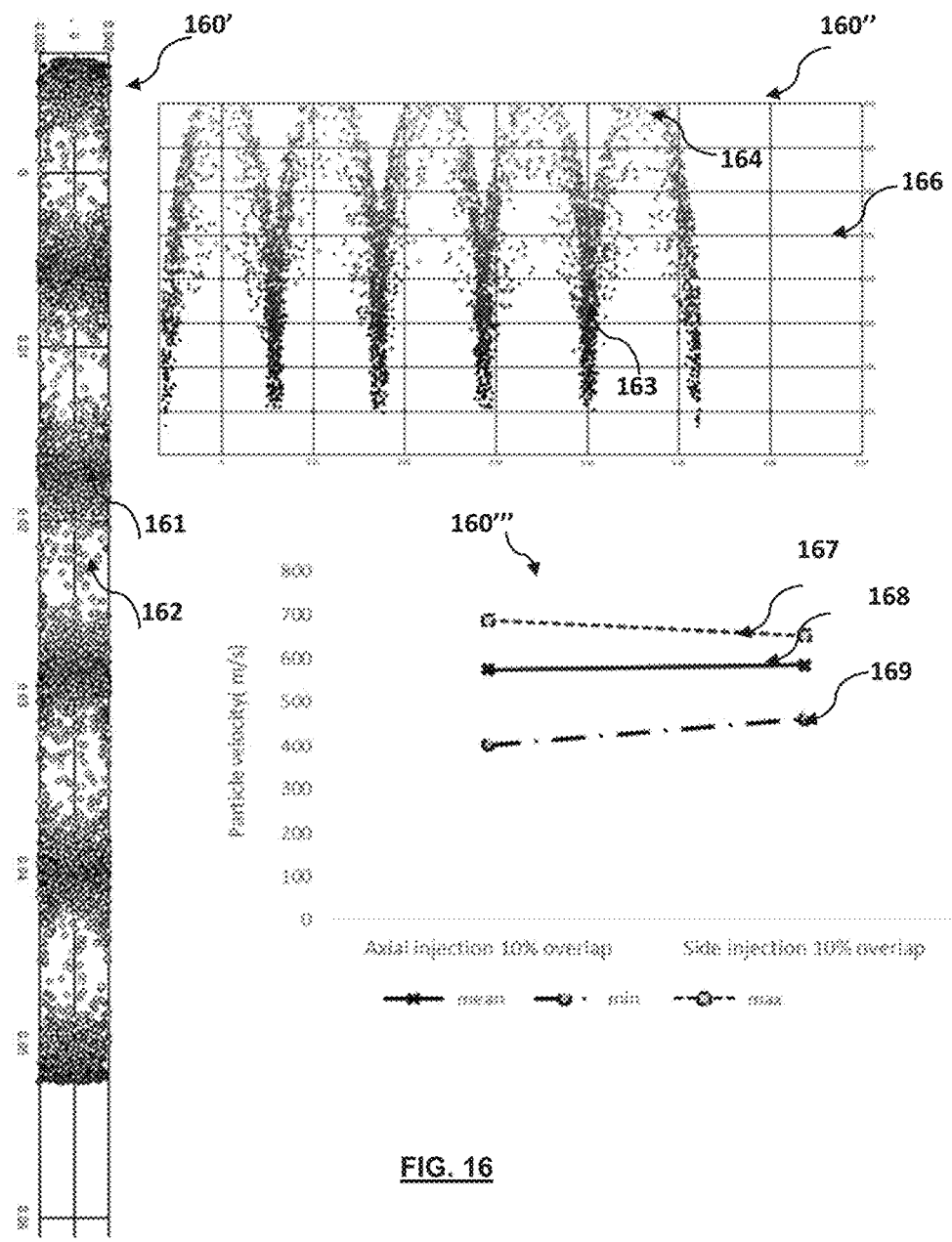
FIG. 16 is simulation results showing particle velocity distribution as well as particle distribution map when particles were injected axially to all channels, according to some known art.

As discussed earlier, axial injection is believed to provide higher particle velocity compared to side injection as provided in this disclosure. To demonstrate the impact of axial particle injection to the multi nozzle cold spray apparatus 40 on the particle velocity and distribution, simulations were carried out utilizing the procedures described above. Now referring to FIG. 16, target particle distribution map 160' shows quite non uniform distribution comprising of zones 161 with a lot of particles and zones 162 with a few particles. Further the particle velocity distribution map 162" shows that although some particles achieved significantly higher velocities 164 than the critical velocity 166, but their fraction was low. A large fraction of the particles 163 showed velocities lower than the critical velocity 166. Further, from graph 160''', it is seen that although the maximum particle velocity 167 for axial injection was higher than the case of side injection, the mean particle velocity 168 was slightly lower for the case of axial injection. Additionally, the spread between maximum and minimum particle velocity was the largest for the case of axial injection. It will be appreciated that the multi nozzle cold spray apparatus 40 as disclosed here provides the most uniform particle distribution as well as the minimum spread (standard deviation) of particle velocities, beneficially impacting the resulting coating.

Figure 17:
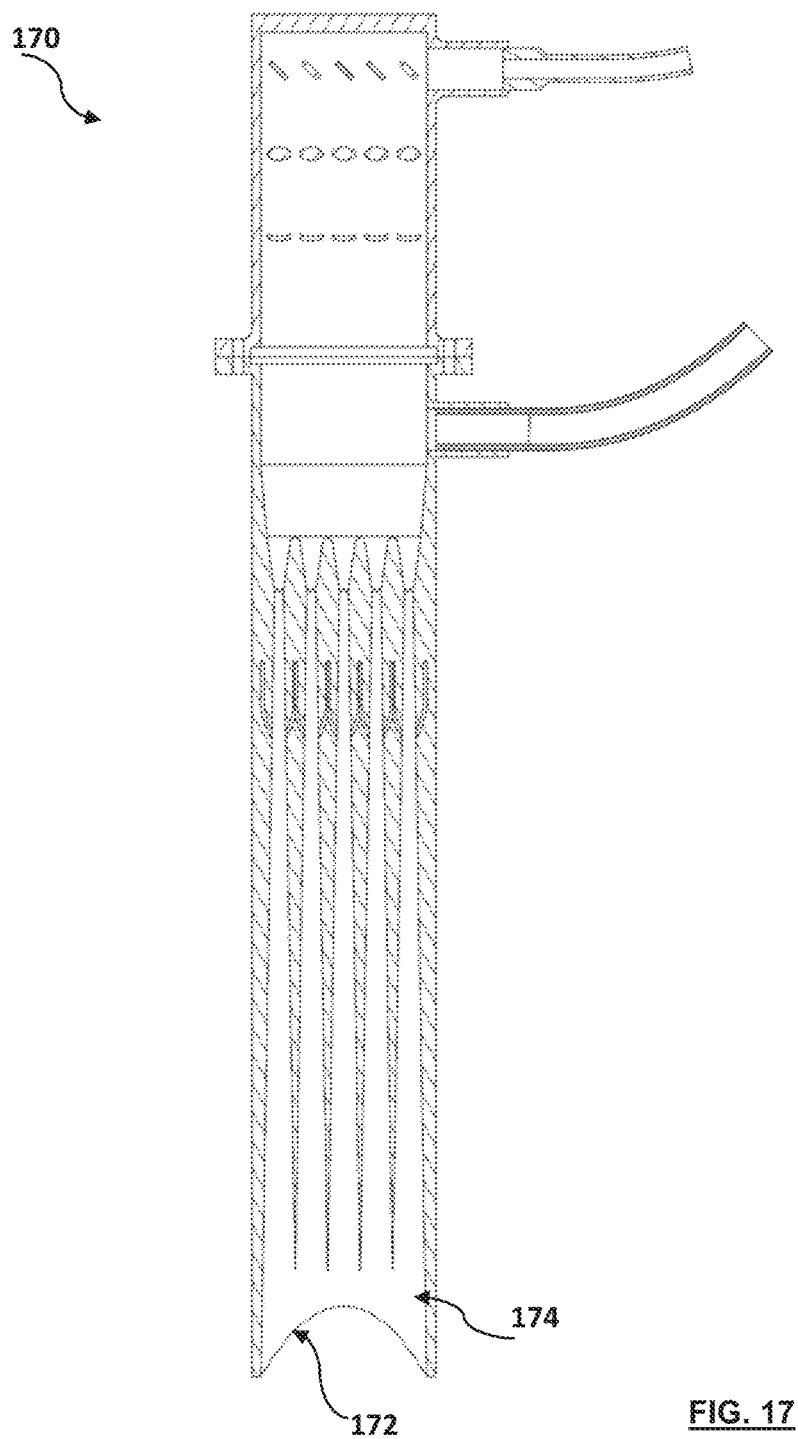
FIG. 17 is a cross sectional view a multi-nozzle assembly with parabolic exit profile according to some embodiments of the present teachings.
Figure 18:
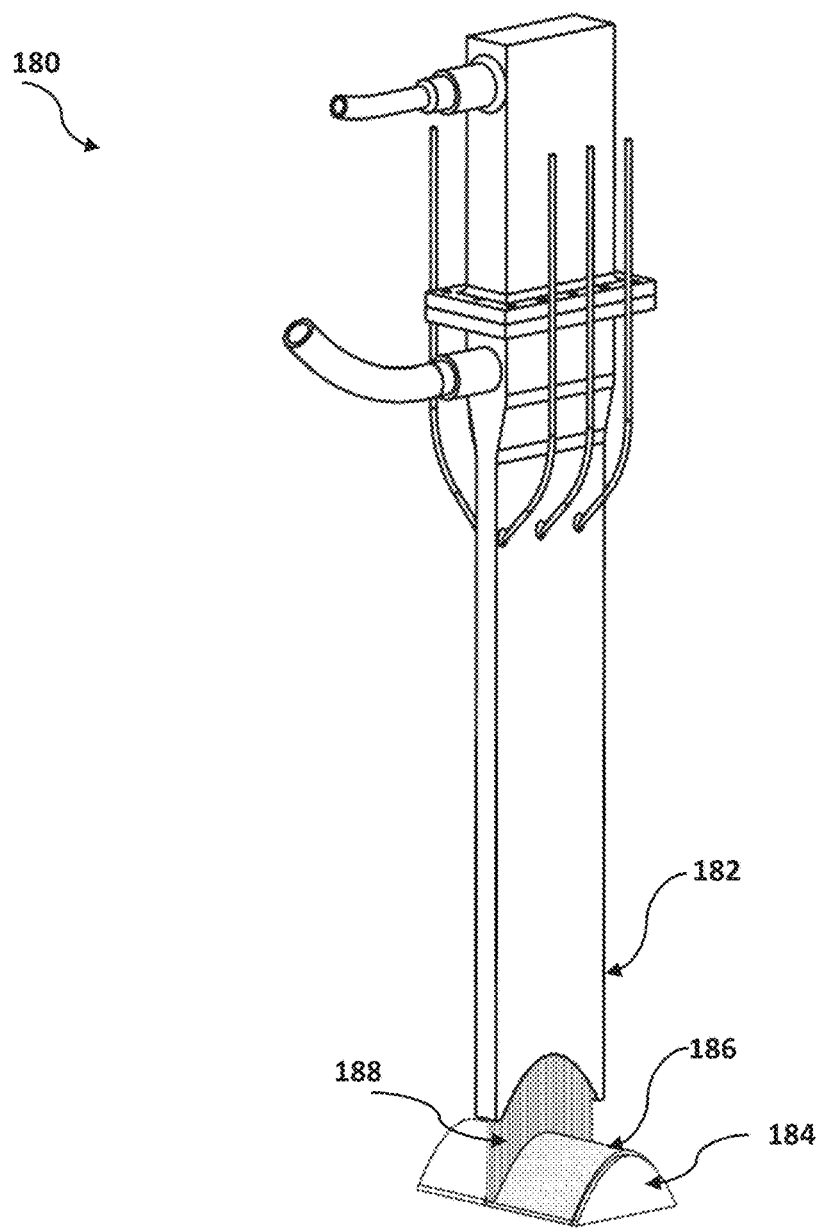
FIG. 18 is a perspective view of the device arrangement for conformal coating of a parabolic surface according to some embodiments of the present teachings.
Figure 19:
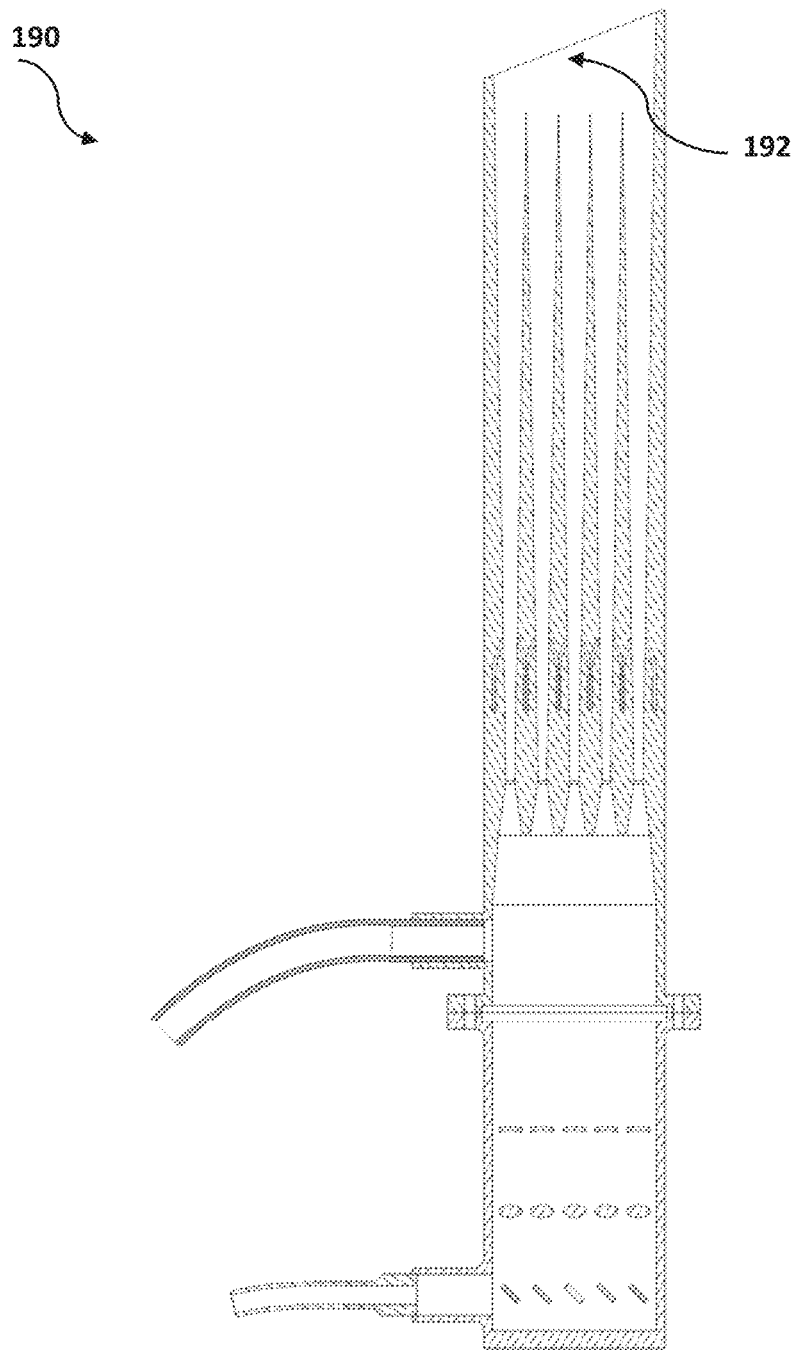
FIG. 19 is a cross sectional view a multi-nozzle assembly with sloping exit profile according to some embodiments of the present teachings.
Figure 20:
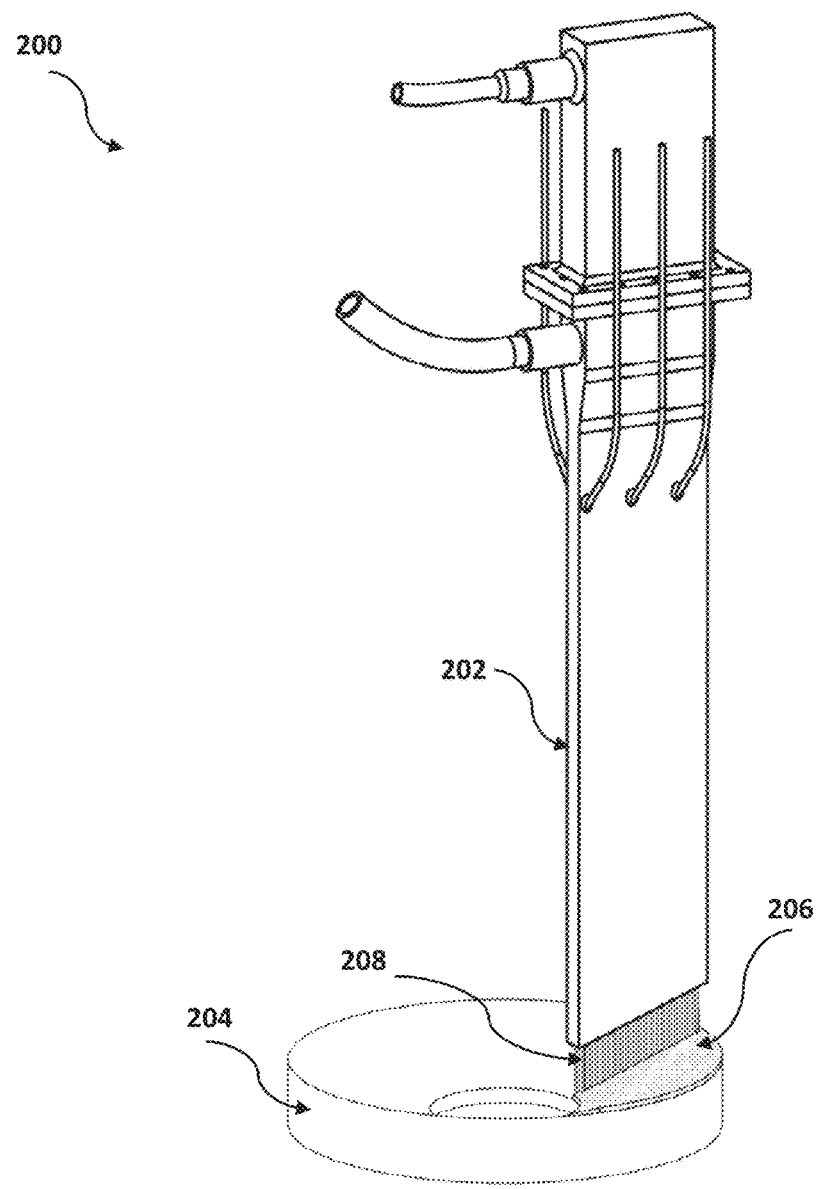
FIG. 20 is a perspective view of the device arrangement for conformal coating of a conical surface according to some embodiments of the present teachings.

Referring to FIG. 17, the multi nozzle cold spray apparatus 170 comprises of a common exit 174 that has a parabolic profile 172. If all the internal passages remain same, the overlap will vary along the parabola. To obtain an optimal particulate distribution as well as velocity characteristics, this overlap can be adjusted. The use of such a nozzle to coat a parabolic surface 184 is shown in FIG. 18. Accordingly, such an apparatus can also be used to build parabolic objects. Another multi nozzle cold spray apparatus 190 is shown in FIG. 19 and it can include a tapered exit 192. Also, this apparatus will have a varying overlap and an optimal overlap needs to be selected to ensure a good deposit. FIG. 20 shows the use of such apparatus in coating a conical surface 206 where the coating mass varies radially, which can be adjusted by varying the particle feed. Further, the tapered nozzle exit can ensure a fixed target distance. Additionally, the apparatus 200 can be used to build objects having a conical profile 204. Accordingly, many different common exit nozzle profiles can be adopted to achieve different deposition profiles. This also can optionally include supplying a desired amount of particles to each nozzle to achieve differential coating mass on the substrate, which in turn develops a desired geometric profile or conformality.

While aspects of the invention have been illustrated and described, it is not intended that these aspects illustrate and describe all possible forms of the invention. Rather, the words used in the specification are words of description rather than limitation, and it is understood that various changes may be made without departing from the spirit and scope of the invention.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

What is claimed is:

1. A cold spray apparatus for applying a coating of particles to a substrate comprising:

a nozzle assembly having a plurality of inner passages, each of the inner passages including a nozzle entrance, a nozzle exit, a convergent section, a divergent section, and a throat between the convergent section and the divergent section, each of the plurality of inner passages extending in a flow direction from the convergent section adjacent the nozzle entrance through a throat to the divergent section adjacent the nozzle exit, the plurality of inner passages sharing a common exit out of the nozzle assembly, the nozzle assembly including walls between each of the plurality of inner passages with each of said walls extending in a longitudinal direction toward the common exit, each of said walls extending from the throat of each of the inner passages to a termination point of each of the inner passages;

a gas supply member providing a supplied gas to the plurality of inner passages of the nozzle assembly to flow through the plurality of inner passages of the nozzle assembly and accelerate through the plurality of inner passages by passage through the convergent section, the throat, and the divergent section of each of the plurality of inner passages;

a particle supply member in direct communication with the plurality of inner passages, the particle supply member supplying the particles directly to the divergent sections to flow the particles in the gas supplied by the gas supply member and out of the nozzle assembly via the common exit toward the substrate to coat the substrate, each of the plurality of inner passages defining an ML distance as a distance between the throat of the inner passage and the termination point of the inner passage, the nozzle assembly defining an DL distance as a distance between the throat of the inner passage and the common exit, the distance the termination point of each of the plurality of inner passages is away from the common exit defining an overlap; and a laser that emits a laser beam that is transmitted through each of the plurality of inner passages containing the supplied gas, the laser heats the particles below the particles' melting point and heats the substrate to promote cold spray coating of the substrate with the particles.

2. The cold spray apparatus of claim 1 wherein each of the convergent sections, the throats, and the divergent sections of the plurality of inner passages is substantially rectangular in cross sectional planes that intersect perpendicularly and transversely to a longitudinal axis of the inner passage.

3. The cold spray apparatus of claim 1 wherein each of the convergent sections of the plurality of inner passages is substantially rectangular in cross sectional planes that intersect perpendicularly and transversely to a longitudinal axis of the inner passage.

4. The cold spray apparatus of claim 1 wherein each of the throats of the plurality of inner passages is substantially square in cross sectional planes that intersect perpendicularly and transversely to a longitudinal axis of the inner passage.

5. The cold spray apparatus of claim 1 wherein each of the divergent sections of the plurality of inner passages is substantially rectangular in cross sectional planes that intersect perpendicularly and transversely to a longitudinal axis of the inner passage.

6. The cold spray apparatus of claim 1 wherein each of the convergent sections and divergent sections of the plurality of inner passages is substantially rectangular in cross sectional planes that intersect perpendicularly and transversely to a longitudinal axis of the inner passage, the convergent sections being substantially rectangular in a first direction and the divergent sections being substantially rectangular in a second direction orthogonal to the first direction.

7. The cold spray apparatus of claim 1 wherein each of the divergent sections of the plurality of inner passages terminates at a position upstream of the common exit.

8. The cold spray apparatus of claim 7 wherein a width of the common exit is substantially equal to or greater than a sum of a width of all nozzle exits of the plurality of all the inner passages.

9. The cold spray apparatus of claim 1 wherein the overlap is greater than about 10%.

10. The cold spray apparatus of claim 1 wherein the overlap is greater than about 20%.

11. The cold spray apparatus of claim 1, wherein the particle supply member supplying the particles directly to the divergent sections to flow the particles in the gas supplied by the gas supply member, accelerate the particles within the divergent sections, and exit the particles out of the nozzle assembly via the common exit toward the substrate to coat the substrate.

12. The cold spray apparatus of claim 1, wherein the laser heats the particles below the particles' melting point comprises the laser heating the particles below the particles' melting point only in and downstream of the divergent sections.

13. The cold spray apparatus of claim 1, wherein the inner passage has a substantially straight longitudinal axis, and wherein the laser beam is directed substantially parallel and coaxial to the longitudinal axis, out of the common exit, and toward the substrate.

14. The cold spray apparatus of claim 13, wherein the inner passage includes a nozzle entrance, wherein the longitudinal axis extends through both the nozzle entrance and the nozzle exit, and wherein the laser is operably coupled to the nozzle assembly such that the laser beam is transmitted into the nozzle assembly via the nozzle entrance.

15. The cold spray apparatus of claim 1, further comprising a pressure tube that is disposed between the laser and the nozzle assembly, the pressure tube being in fluid communication with the plurality of inner passages, the gas supply member supplies a gas to the pressure tube to flow through the plurality of inner passages of the nozzle assembly and out of the common exit.

16. The cold spray apparatus of claim 1 wherein the particle supply member introduces the particles into the plurality of inner passages at an acute angle.

17. The cold spray apparatus of claim 1, further comprising: one or more optical assemblies transmitting a single laser beam from the laser into the plurality of inner passages of the nozzle assembly.

18. The cold spray apparatus of claim 1 wherein the gas supply member supplying the gas to the plurality of inner passages of the nozzle assembly comprises the gas supply member selectively supplying the gas to the plurality of inner passages.

\* \* \* \* \*